United States Patent
Atkinson et al.

(10) Patent No.: US 11,467,433 B2
(45) Date of Patent: Oct. 11, 2022

(54) POLYMORPHIC ELECTRO-OPTIC DISPLAYS

(71) Applicants: Paul Atkinson, Poway, CA (US); John Rilum, Tustin, CA (US); Ben Reeves, Missoula, MT (US)

(72) Inventors: Paul Atkinson, Poway, CA (US); John Rilum, Tustin, CA (US); Ben Reeves, Missoula, MT (US)

( * ) Notice: Subject to any disclaimer, the term of this patent is extended or adjusted under 35 U.S.C. 154(b) by 141 days.

(21) Appl. No.: 16/553,572

(22) Filed: Aug. 28, 2019

(65) Prior Publication Data

US 2021/0063775 A1 Mar. 4, 2021
US 2022/0050312 A9 Feb. 17, 2022

Related U.S. Application Data

(63) Continuation-in-part of application No. 15/958,813, filed on Apr. 20, 2018, which is a continuation-in-part of application No. 15/890,312, filed on Feb. 6, 2018, now Pat. No. 11,353,693.

(60) Provisional application No. 62/723,835, filed on Aug. 28, 2018, provisional application No. 62/478,216, filed on Mar. 29, 2017, provisional application No. 62/455,502, filed on Feb. 6, 2017.

(51) Int. Cl.
*G02F 1/03* (2006.01)
*G02F 1/01* (2006.01)

(52) U.S. Cl.
CPC .......... *G02F 1/0102* (2013.01); *G02F 1/0121* (2013.01); *G02F 2202/022* (2013.01)

(58) Field of Classification Search
CPC . G02F 1/0102; G02F 1/0121; G02F 2202/022
USPC .......................................................... 359/245
See application file for complete search history.

(56) References Cited

U.S. PATENT DOCUMENTS

2014/0307302 A1* 10/2014 Andersson Ersman ..................... G02F 1/1533
359/265

FOREIGN PATENT DOCUMENTS

WO WO-2018145123 A1 * 8/2018 ............. G02F 1/163

* cited by examiner

*Primary Examiner* — William Choi

(57) ABSTRACT

Described herein is a polymorphic display, which is a unitary apparatus constructed such that a wide variety of electro-optic functions are enabled. The polymorphic display, even when having multiple pixels, enables sharing of selected structures among the pixels. In a multi-pixel construction, there is a set of pixels in the display that exhibit one set of operable properties, such as particular stability, sequencing, and switching properties, and another set of pixels that are different from the first set. That is, they have different stability, sequencing, or switching properties. In such a way, a highly flexible polymorphic display may be construed to satisfy a wide range of display needs.

47 Claims, 29 Drawing Sheets

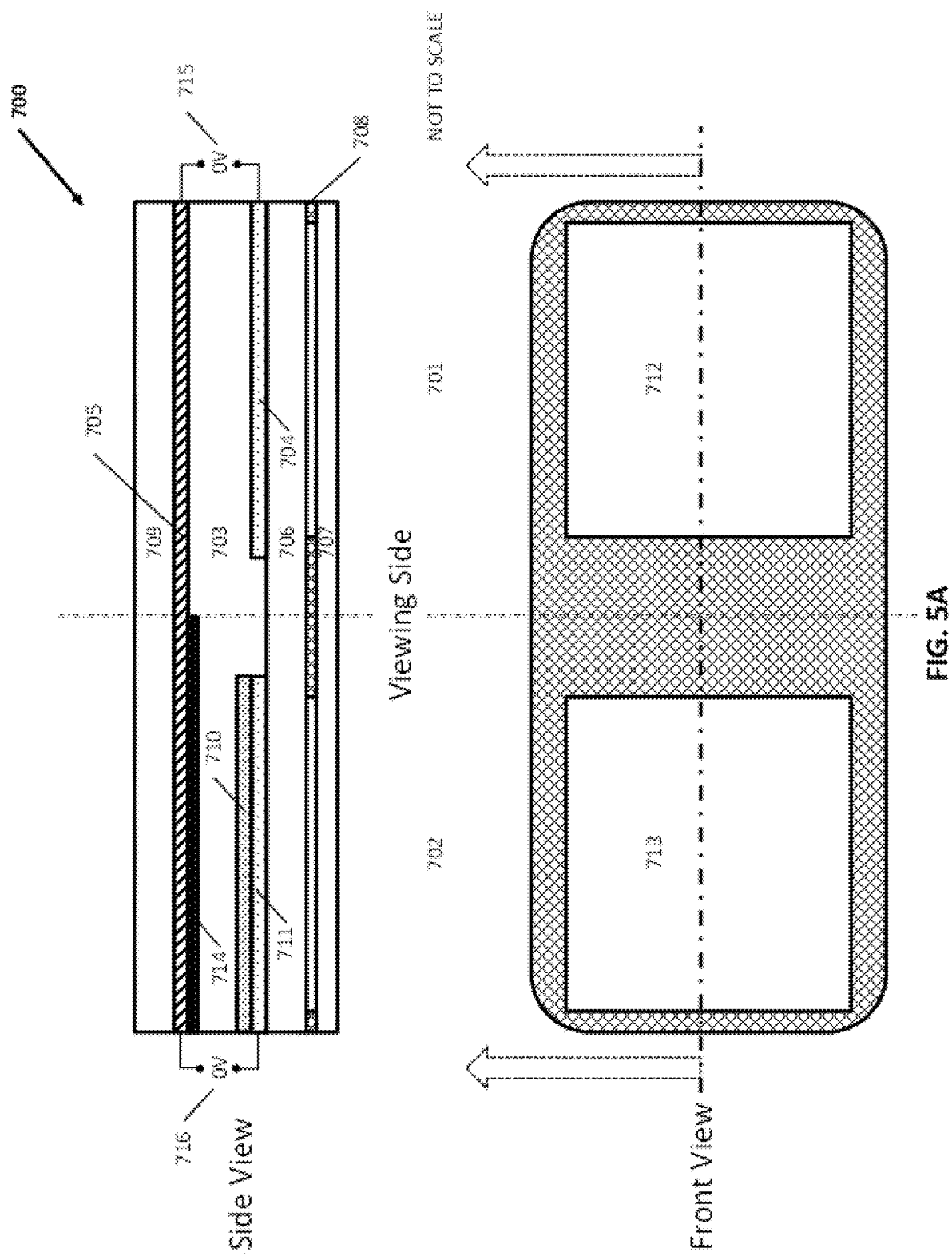

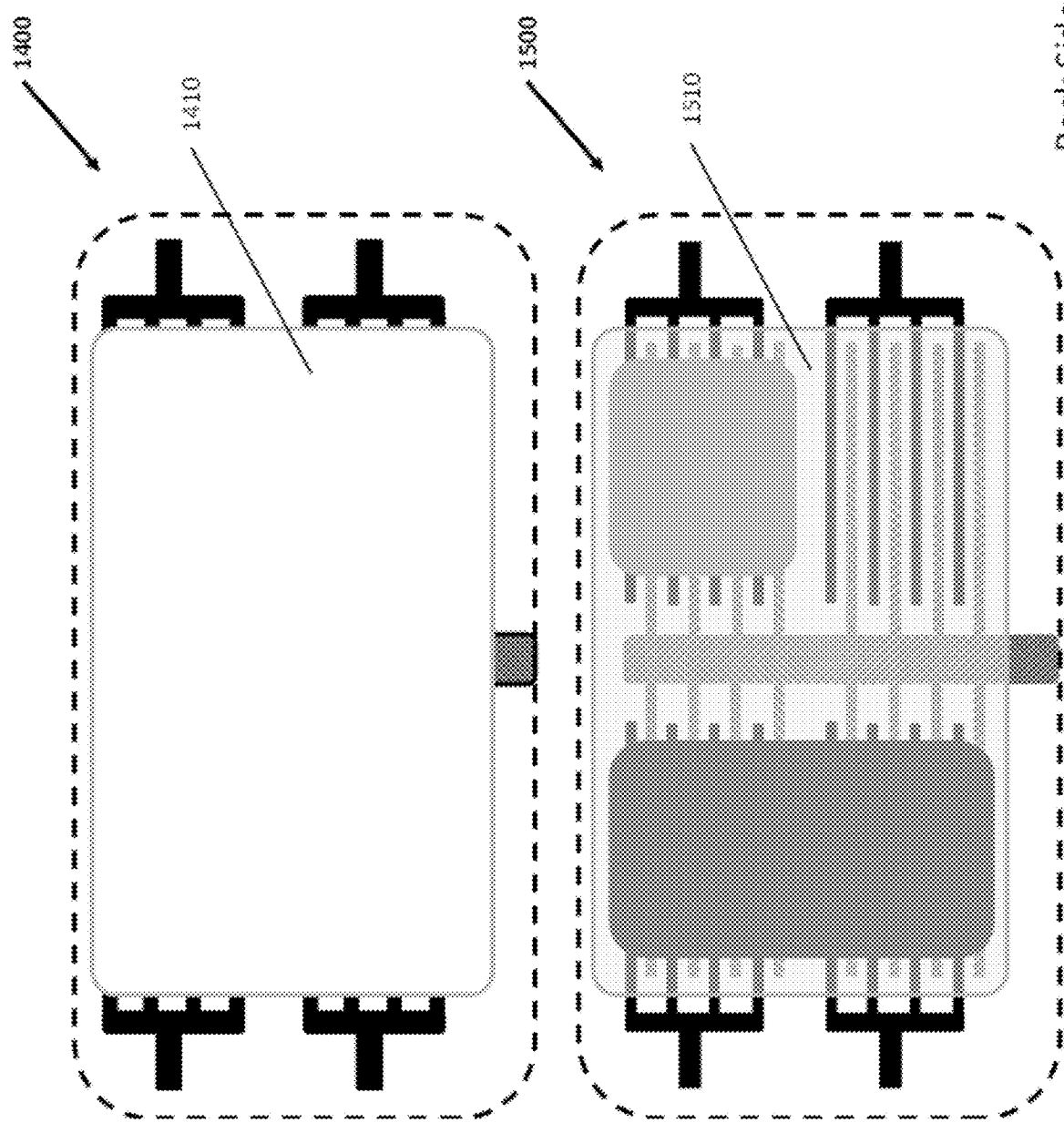

Legend

White       Purple

Blue        Dark Blue or Green

Dark Blue   Black or Yellow

Red

Stable State       Switchable Transitions

Switchable Transition

Volatile State     Self-Switchable Transition

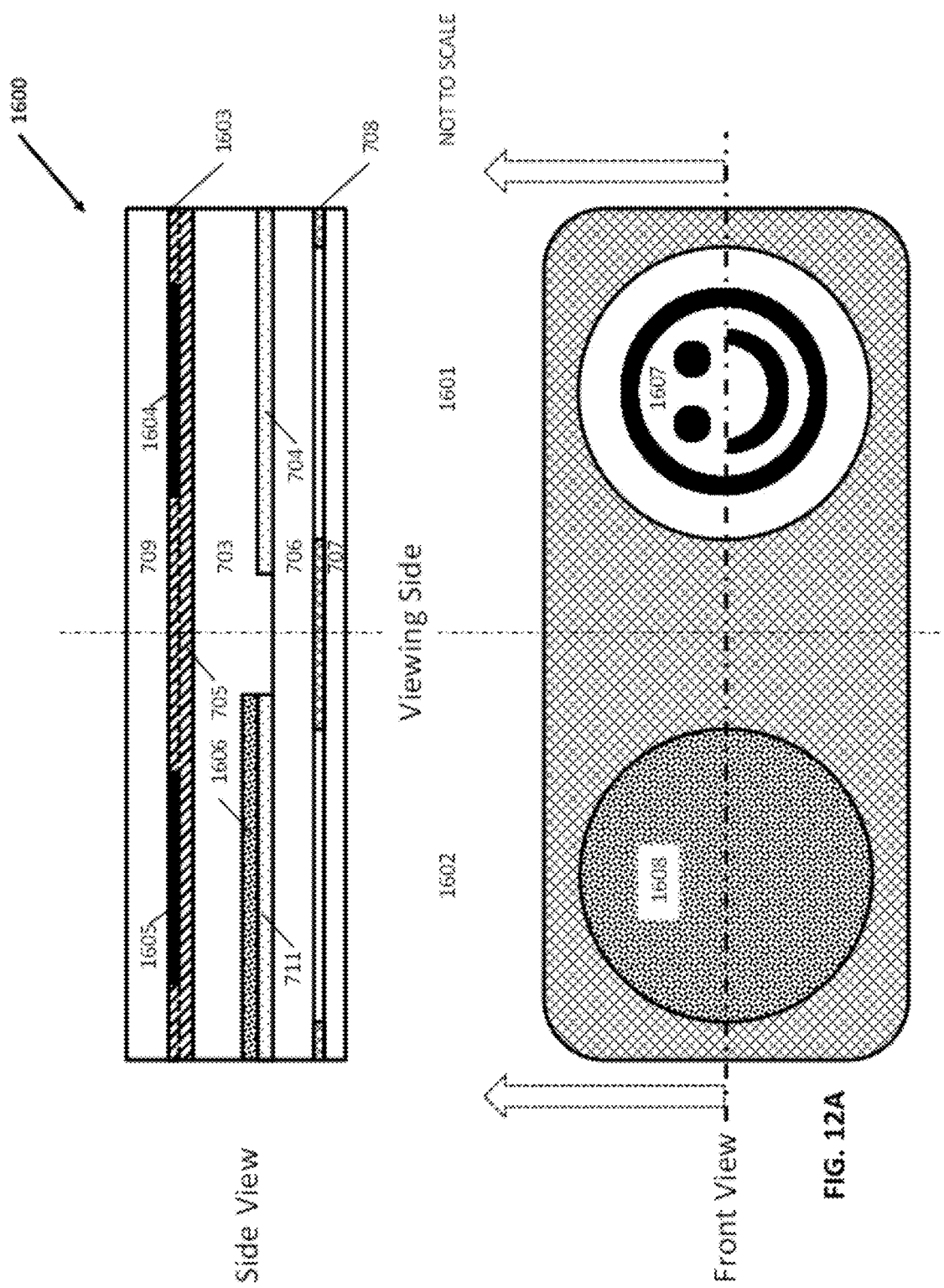

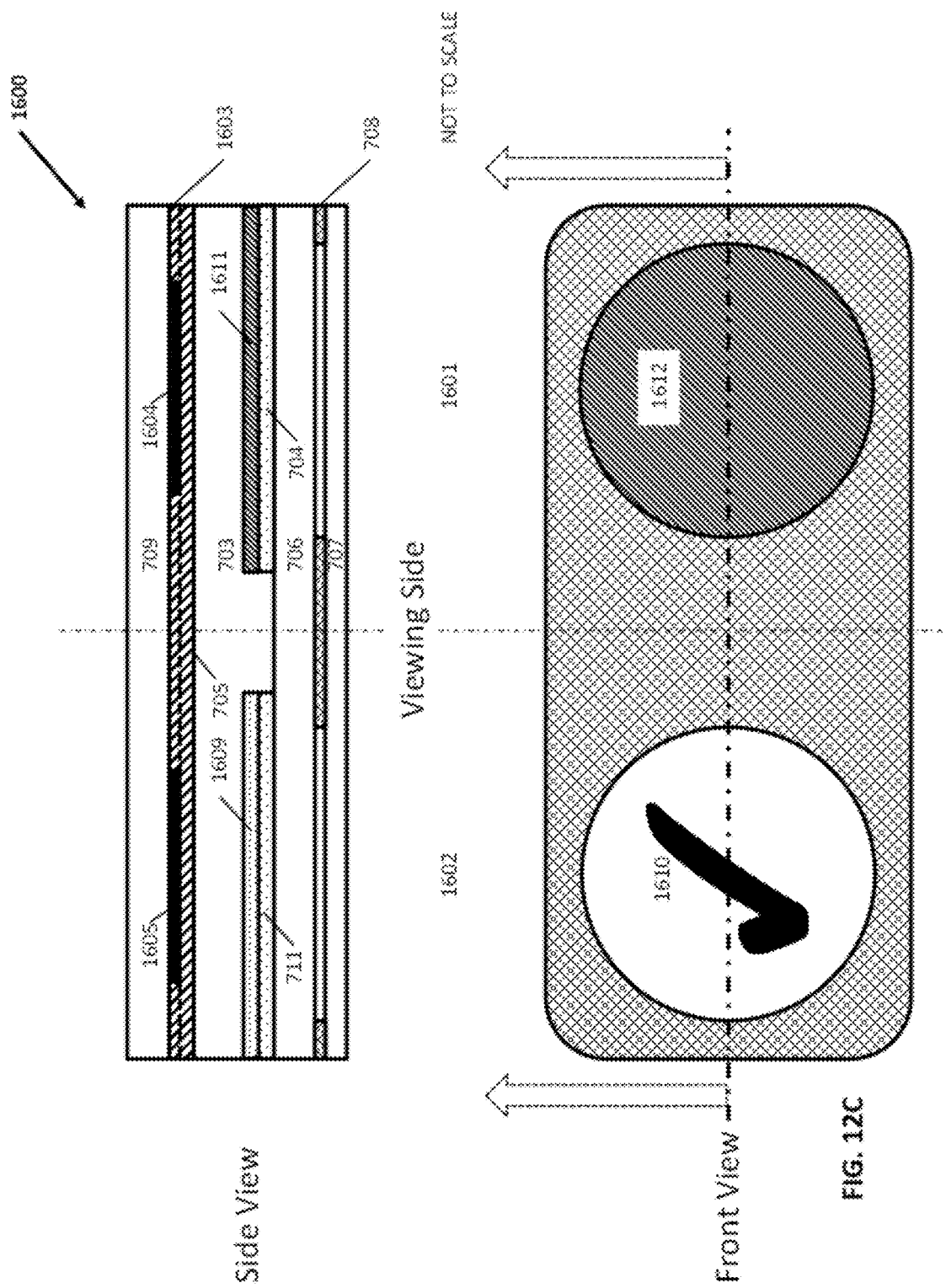

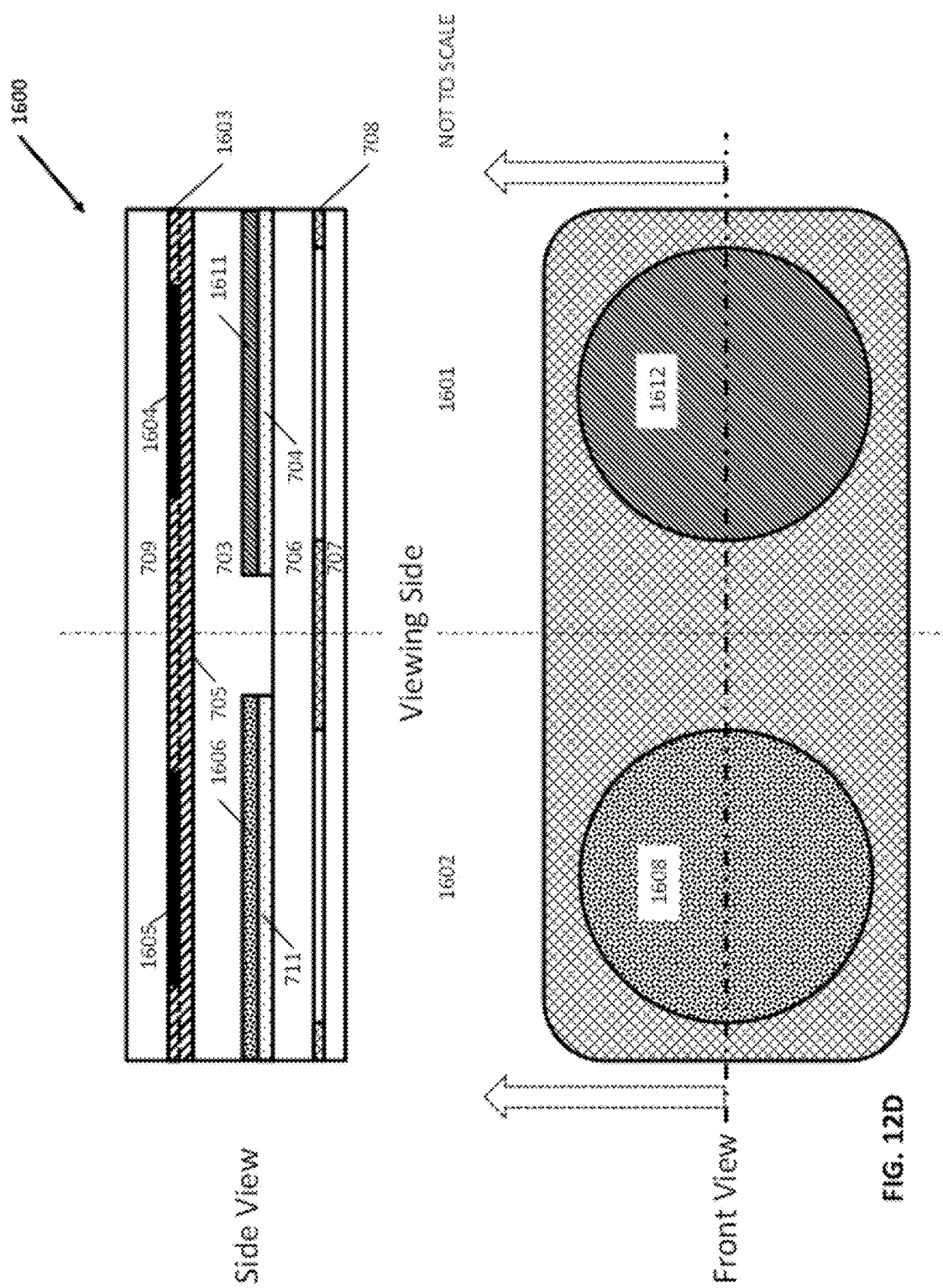

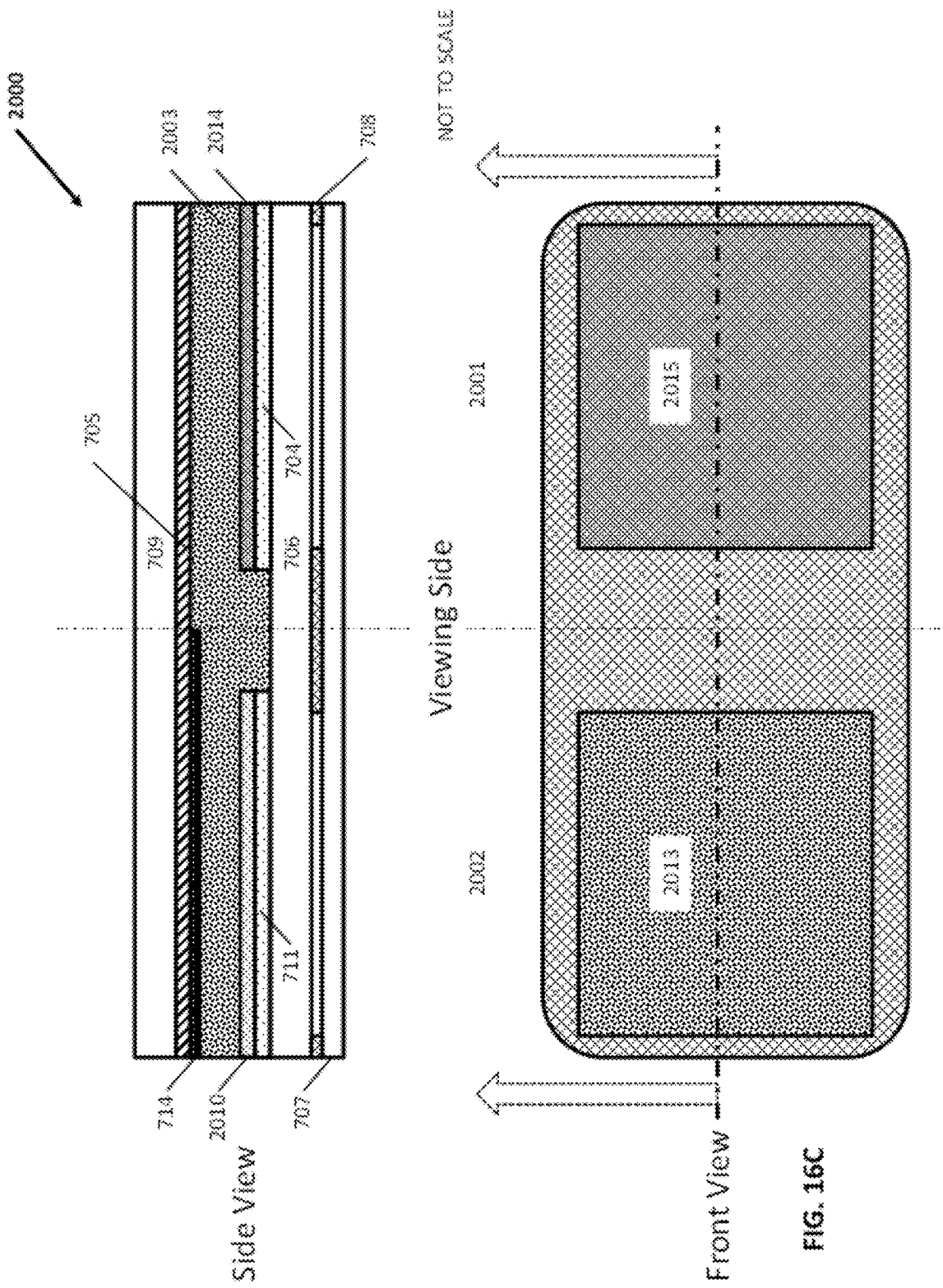

POLYMORPHIC ELECTRO-OPTIC DISPLAYS

RELATED APPLICATIONS

This application claims priority to U.S. provisional patent application No. 62/723,835, filed Aug. 28, 2018, and entitled "Novel Display Device." This application is also a continuation-in-part application to U.S. patent application Ser. No. 15/958,813, filed Apr. 20, 2018, and entitled "Polymorphic electro-optic Displays, which is a continuation in part application to U.S. patent application Ser. No. 15/890,312, filed Feb. 6, 2018, and entitled "Polymorphic Electro-Optic Displays," which claims priority to U.S. provisional patent application No. 62/478,216, filed Mar. 29, 2017 and entitled "Hybrid Displays," and to U.S. provisional patent application No. 62/455,502, filed Feb. 6, 2017, and entitled "Hybrid Displays," both of which are incorporated herein by reference. This application is related to U.S. patent application Ser. No. 13/002,275, filed Dec. 30, 2010, now issued as U.S. Pat. No. 9,030,724; and to U.S. patent application Ser. No. 14/797,141, filed Jul. 12, 2015, both of are incorporated herein by reference.

FIELD OF THE INVENTION

The field of the invention is manufacture and use of electronic displays comprised of electro-optic pixels.

BACKGROUND

The internet of things (IoT) and other emerging markets for inexpensive, and often disposable, intelligent electronic devices are creating demand for smaller, thinner, often flexible, ruggedized, and fit-for-purpose electro-optic displays. Currently known display devices are constructed of multiple pixels, that when viewed together, display a message or symbol to the user. The pixels of these conventional displays, are of the same type. A mono-stable display for example will have only mono-stable pixels while a bi-stable display will have only two stable-states, electrically switchable pixels. The pixels of common (non cholesteric) LCDs are mono-stable, but each is the same as the others. The pixels of three-color electrophoretic displays are multi-stable, that is they are stable in three states, but the pixels themselves are all the same.

SUMMARY

Described herein is a polymorphic display, which is a unitary apparatus constructed such that a wide variety of electro-optic functions are enabled. The polymorphic display, even when having multiple pixels, enables sharing of selected structures among the pixels. In a multi-pixel construction, there is a set of pixels in the display that exhibit one set of operable properties, such as particular stability, sequencing, and switching properties, and another set of pixels that are different from the first set. That is, they have different stability, sequencing, or switching properties. In such a way, a highly flexible polymorphic display may be construed to satisfy a wide range of display need.

The ability to create different, fit-for-purpose transition sequences is an important benefit of polymorphic displays and as described below, of polymorphic pixels. Of particular benefit of the property of transition sequencing is the ability to selectively and dynamically determine and effect a transition sequence, and therefore the operable properties of a polymorphic pixel or polymorphic display, responsive to different electrical signals. And further, where the electrical signals are generated responsive to various conditions, events and actions etc., such as those common to intelligent display devices described later herein.

BRIEF DESCRIPTION OF THE DRAWINGS

FIG. 5A is a block representative of a display in accordance with the present invention.

FIG. 10B is a block representative of a display in accordance with the present invention.

FIG. 12A is a block representative of a display in accordance with the present invention.

FIG. 12C is a block representative of a display in accordance with the present invention.

FIG. 12D is a block representative of a display in accordance with the present invention.

FIG. 16C is a block representative of a display in accordance with the present invention.

DESCRIPTION

Figure 1:
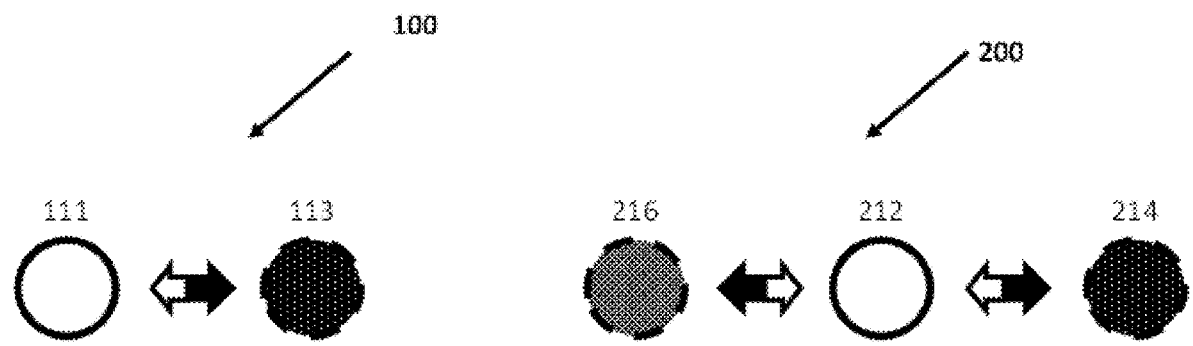
FIG. 1 is a diagram showing operable states and corresponding optical states for a display in accordance with the present invention.

Described herein are polymorphic electro-optic displays ("polymorphic displays"). Polymorphic displays are unitary apparatus having multiple operable properties. Of particular interest are the operable properties, individually and in combination, of stability, switching and transition sequencing.

Mono-stable, bi-stable, multi-stable, permanent
Electrically switchable, self-switchable, non-switchable
Reversible, irreversible, repeatable Polymorphic displays may be constructed to have multiple types of electro-optic display pixels ("pixels"), each type having different operable properties. Polymorphic displays may also be constructed with "polymorphic pixels" described herein, that individually have multiple operable properties, and are independently operable to produce different operating states.

The operable properties of a polymorphic display's pixels determine its possible operating states, e.g. whether the pixel is stable or volatile, switchable or self-switching from one state to another or not switchable once in a previously switched to state, or the transition sequence is forward, forward-only (irreversible), reverse, or branching, or a combination thereof.

The optical state of a polymorphic display's pixel corresponds to the pixel's operating state[s] according to the pixel's optical properties. For example, one polymorphic display pixel may be white in a stable, first state, and dark blue in a volatile, second state, and red in a third, stable state.

It is important to note that the pixels of conventional electro-optic displays, are of the same type. A mono-stable display for example will have only mono-stable pixels while a bi-stable display will have only two stable, electrically switchable pixels. The pixels of common (non cholesteric) LCDs are mono-stable, but each is the same as the others. The pixels of three-color electrophoretic displays are multi-stable, that is they are stable in three states, but the pixels themselves are all the same.

Pixels have at least two optical states according to their optical properties that typically include color perceptible to the human eye. For a passive (non-emissive) display pixel the optical state of the pixel may in general be determined by the resulting optical reflectivity, transmission, or polarization, of the pixel (at a specific wavelength or wavelength range of the illuminating source), whereas for an emissive display it may be determined by the intensity, polarization and spectral composition of the emitted light. In the case of displays intended for machine reading, the optical state of the pixel may, e.g., be determined by a pseudo-color in the sense of a change in reflectivity at electromagnetic wavelengths outside the human visible range.

Pixels may be of various sizes, shapes, patterns and configured to stand alone or in groups (e.g. as segments to create alphanumeric characters, or RGB super pixels). Pixels typically comprise an electro-optic layer with electrodes either in direct contact with, or in close proximity to, the electro-optic layer. Depending on desired operable properties of the display pixels, the composition of their electro-optic layers may comprise for example, electrochromic materials, liquid crystals, electrophoretic particles, electrowetting fluids, electro-liquid powder materials, etc.

Display pixels may be categorized according to the operable properties associated with them being mono-stable, bi-stable and multi-stable, and polymorphic. Descriptions of the pixel types are described in general below, and later in detail.

Mono-Stable Pixels

Mono-stable pixels have one, stable operating state (and corresponding optical state) and a second, volatile operating state (and corresponding optical state). Mono-stable pixels also have the stability operable properties of being reversible and self-switching. That is, they automatically, or "self", switch from their volatile operating state to back their stable, first operating state when power to the pixel is terminated (or drops below a threshold necessary to maintain the state).

A mono-stable pixel's first, operating state is stable without power. When an electrical switching signal is applied to a mono-stable pixel, the pixel transitions from a stable, first operating state to a volatile, second, operating state. The volatile operating state is maintained as long as a maintenance signal is applied to the pixel. When the maintenance signal is terminated (for whatever reason) the pixel self-switches from the second operating state back to the first, stable operating state. Examples of mono-stable displays comprised of mono-stable pixels are common LCDs (liquid crystal displays), EPDs (electrophoretic and ECDs (electrochromic displays), and LEDs (light-emitting diodes) and OLEDs (organic light-emitting diodes).

Figure 11:
FIG. 11 is a legend to the stippling used in the Figures.
Figure 11:
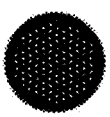
Figure 11:
Figure 11:
Figure 11:
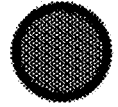
Figure 11:
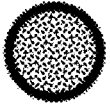
Figure 11:
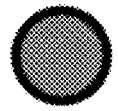
Figure 11:
Figure 11:
Figure 11:
Figure 11:
Figure 11:

The operable states and corresponding optical states of an exemplary mono-stable pixel 100 are illustrated in FIG. 1. In this example, the first operating state 111 is stable and switchable, and its corresponding optical state (color) is white. Note that FIG. 11 presents a legend for colors-to-patterns, shapes and symbols used in the other figures. The second operating state 113 is volatile, self-switchable (reversible), and its corresponding optical state is purple. When self-switched (power is terminated to the pixel) the pixel transitions back (reverses) to the stable, first operating state 111, and corresponding optical state (white).

FIG. 1 Also illustrates a mono-stable pixel 200 similar to mono-stable pixel 100. Mono-stable pixel 200 however has an optional second volatile, self-switching operating state 216, and a corresponding blue optical state. As with the first volatile, self-switching operating state of pixel 100, pixel 200 self-switches from the optional second volatile operating state 216 to the stable, first operating state 212 when power to the pixel is terminated or disrupted.

The pixel 200 has the transition sequence property (described later) of branching, that is the property whereby the transition sequence depends on the current state of the pixel and the switching signal. In this example, a first switching signal transitions the pixel from its stable, switchable first operating state 212 to a first volatile, self-switchable operable state 214, and a corresponding optical state, in this case purple. After the pixel 200 has self-switched to the stable, switchable first operating state 212, a second switching signal (different than the first) transitions the pixel to a second volatile, self-switchable operable state 216, and corresponding optical state, in this case blue.

Bi-Stable and Multi-Stable Pixels

Bi-stable pixels have two stable operating states. Switching between the two, stable operating states is accomplished with an electrical switching signal. Once switched, the operating state (and the corresponding optical state) persists when the power is terminated (without a maintenance signal).

Bi-stable pixels may be reversible (e.g. EPDs, conventional ECDs, cholesteric, ferroelectric or zenithal bistable LCDs) or irreversible (as described in U.S. Pat. No. 9,030,724 Flexible and Printable Electrooptic Devices). Conventional bi-stable pixels are electrically switched and are not self-switching (but always switchable). Some pixels characterized as bi-stable however, have limited persistence in one or the other optical states. In other words, some bi-stable pixels are self-switching over time. Such pixels, may therefore be more accurately considered mono-stable with limited persistence in the second operating state (the first being unpowered).

Figure 2:
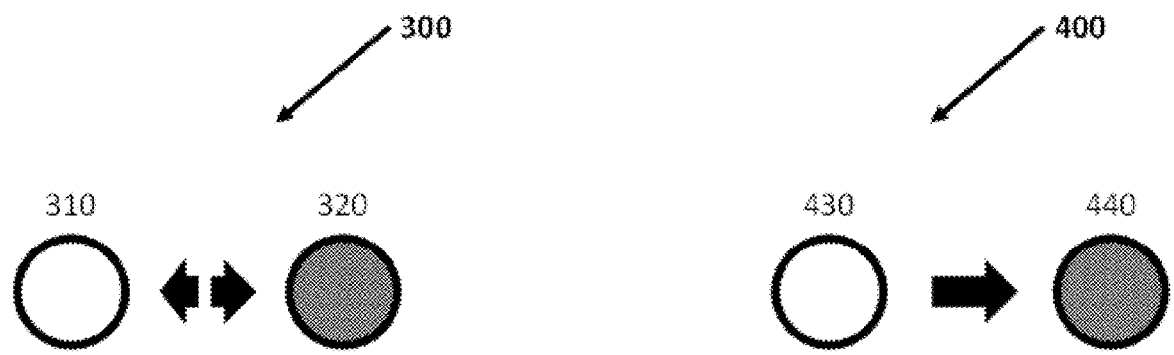
FIG. 2 is a diagram showing operable states and corresponding optical states for a display in accordance with the present invention.

The operable states and corresponding optical states of exemplary bi-stable pixels are illustrated in FIG. 2. Pixel 300 has a first operating state 310 that is stable and switchable, and a corresponding optical state (color) that is white. The second operating state 320 is also stable and switchable (and reversible), and its corresponding optical state is red. Note that a maintenance signal is not required for the pixel to remain in the second operating state once switched from the first operating state. Note further that the second operating state is not self-switching, and a switching signal is required to switch from the second, stable operating state, and corresponding optical state, back to the first stable operating state.

Pixel 400 is also bi-stable however unlike the pixel 300 in the previous example, once switched from the first stable, switchable operable state 430 to the second, stable operable state 440, pixel 400 is non-switchable (not switchable or self-switching). In the second operable state, pixel 400 is irreversible and permanent. It cannot be switched (transitioned from the second operable state to the first) and has the stability property of being non-switchable and a transition sequence property of being irreversible.

In addition to bi-stable pixels there are a few types of multi-stable pixels, typically having three, stable states. One example are the pixels in three-color, electrophoretic displays. Each pixel contains three distinct particle types (e.g., pigment or dye particle) corresponding to different colors. Note however that as with conventional mono-stable and bi-stable displays, the operable properties of the pixels are the same.

Figure 3:
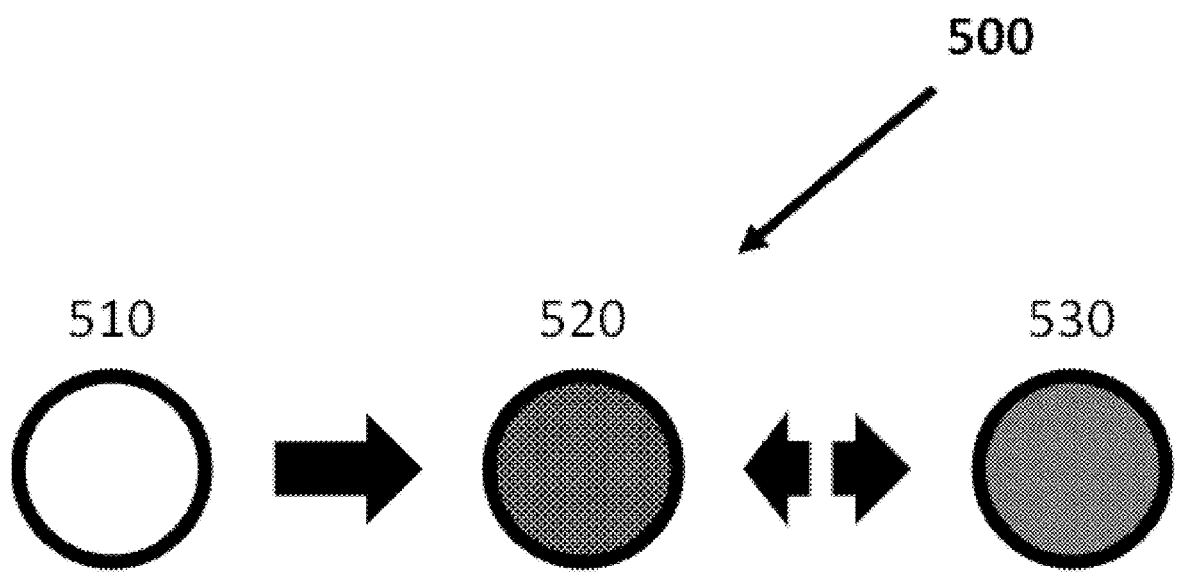
FIG. 3 is a diagram showing operable states and corresponding optical states for a display in accordance with the present invention.

The operable states of a multi-state pixel 500 are illustrated in FIG. 3. In the first operating state 510 pixel 500 is stable, switchable (forward-only, irreversibly) with a corresponding optical state (color) that is white. The second operating state 520 is also stable and switchable, with a corresponding optical state (color) that is blue. In the second operating state however, the transition sequence is forward-only to the third operating state 530. It cannot be switched to the first stable operating state from the second stable operating state. The third operating state 530 is also stable and switchable, and has a corresponding optical state (color) that is red. Unlike the pixel when in the second operating state 520, when the pixel is in the third stable operating state 530, it can be switched back to its previous operable state 520. And further, unlike the transition from the first operating state to the second, the transitions from the second operating state to the third operating state, and the reverse, are repeatable. The transition sequence therefore comprises three inter-state transitions (described later), one which is forward-only and irreversible, and two that are forward-only, reversible and repeatable.

Polymorphic Pixels

Polymorphic pixels may be constructed to have various combinations of operable properties. Polymorphic pixels have at least two stable operating states, an unpowered, first state and at least one other stable state which may for example be irreversible and permanent as previously described. They also have one or more volatile operating states.

Figure 4:
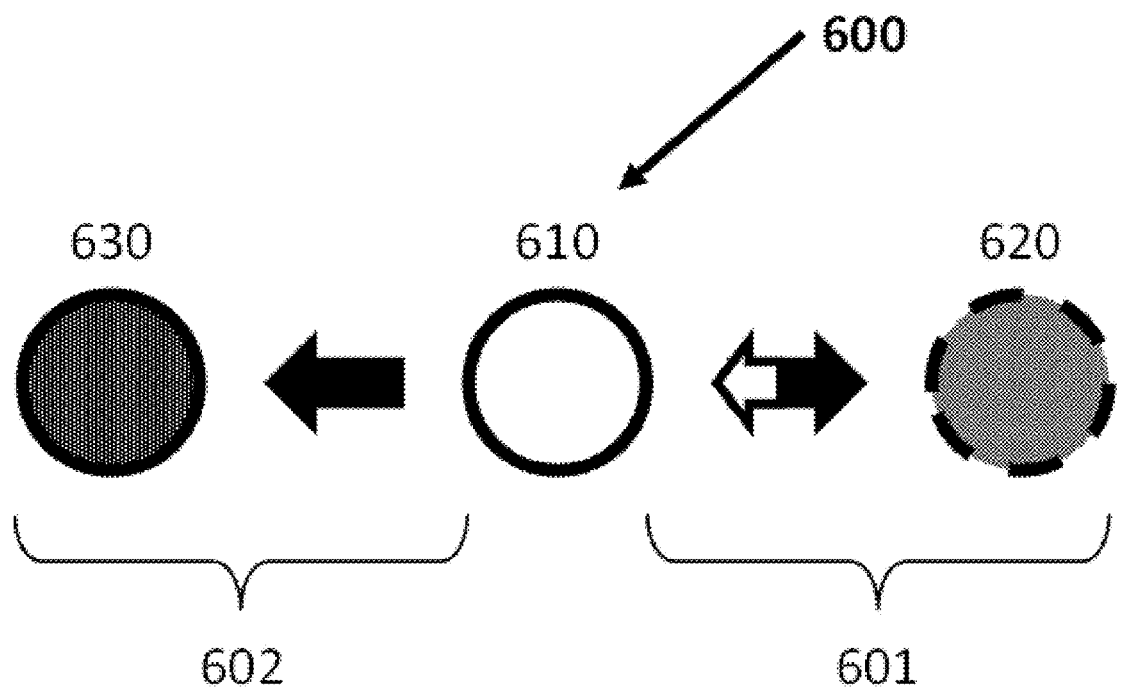
FIG. 4 is a diagram showing operable states and corresponding optical states for a display in accordance with the present invention.

FIG. 4 illustrates the operable states of a polymorphic pixel 600. The pixel has two stable operating states 610 and 630 and one volatile operating state 620. Pixel 600 also has two transition sequence branches 601 and 602. The transition sequence branch is selected with a switching signal that determines the next operating state. Branch 601 comprises a first operating state 610 that is stable, switchable with a corresponding optical state (color) that is white. Branch 601 also comprises a second operating state 620 that is volatile, self-switching with a corresponding optical state (color) that is red. Upon termination or disruption of a maintenance signal, pixel 600 will self-switch and transition from the volatile, self-switching state 620 to the previous operating state 610. Branch 601 comprises two inter-state transitions which are both reversible and repeatable, until and unless, transition sequence branch 602 is selected with a switching signal that transitions to operating state 630.

Branch 602 comprises the same first operating state 610 as branch 601, however unlike branch 601 it has a second operating state 630 that is irreversible and permanent. Because operating state 630 is irreversible and permanent, branch 602 comprises only one inter-state transition, a forward, irreversible transition from operating state 610 to operating state 630. Once switched (transitioned) along branch 602 to operating state 630 by an appropriate switching signal, the pixel is no longer switchable (non-switchable). In total the transition sequence property for pixel 600 includes three inter-state transitions (two repeatable, and one irreversible).

Figure 7:
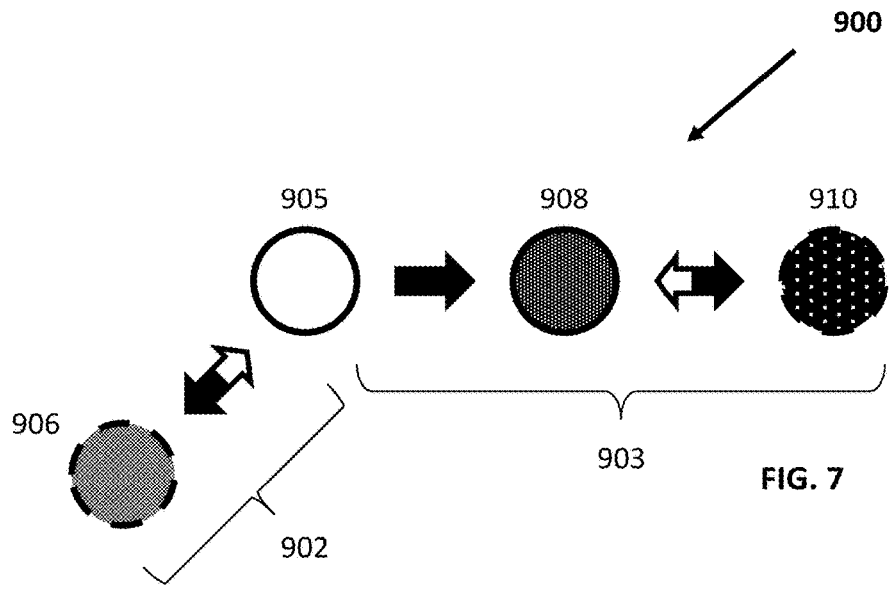
FIG. 7 is a diagram showing operable states and corresponding optical states for a display in accordance with the present invention.

FIG. 7 illustrates the operable states of another exemplary polymorphic pixel 900. The pixel in this case has two stable operating states 905 and 908 (and two corresponding optical states, white and black respectively). Pixel 900 also has two volatile operating states 906 and 910 (and two corresponding optical states, red and purple respectively). In total, polymorphic pixel 900 has four possible operating states and corresponding optical states (red, white, black and purple). Unlike polymorphic pixel 600 polymorphic pixel 900 has a transition sequence comprising two branches 902 and 903. The branch selected depends on the switching signals and the prior operating states of the pixel. In the first operating state 905 pixel 900 is stable, switchable with a corresponding optical state (color) that is white. The transition sequence along branch 902 consists of a stable, switchable first operating state and a volatile, self-switching second operating state. Branch 902 is reversible and repeatable until the pixel is operably switched to branch 903.

The transition sequence along branch 903 consists of the same first operating state 905, stable, switchable with a corresponding optical state (color) that is white. Branch 903 also comprises a stable, switchable second operating state 908 with a corresponding optical state (color) that is black. Once switched from the first operating state 905 to the second operating state 908, the pixel cannot transition back to operating state 905. The transition sequence from 905 to 908 is not reversible (irreversible) and is therefore not repeatable. From operating state 908 the transition sequence is only forward to operating state 910. The third operating state 910 along branch 903 is volatile, self-switching with a corresponding optical state (color) of purple. The inter-state transitions between operating states 908 and 910 are therefore reversible and repeatable.

The transition sequence along the entire branch 903 from operating state 905 to operating state 910 includes both forward, irreversible transitions and forward, reversible transitions. Note that the once the polymorphic pixel 900 is switched and transitions to branch 903 (from operating state 905 to operating 908) it cannot be switched, transition to branch 902 and operating state 908. The polymorphic pixel 900 can however effect different operating states along branch 902 and then switch be switched, transition to branch 903.

Transition Sequencing

An operable property of pixels is transition sequencing, that is, the property of being able to transition between multiple, different operating states in sequences that include forward, forward-only (irreversible), reverse (reversible), repeatable and non-repeatable and combinations thereof. A transition sequence is comprised of inter-state transitions, that is transitions between two consecutive operable states of a pixel. Exemplary transition sequences are described below and illustrated in embodiments 100, 200, 300, 400, 500, 600, 900, and 1000. Transition sequencing also includes branching. Branching is the property of being able generate different sequences of inter-state transitions from a particular operable state of the pixel. A branch is created by effecting one of a plurality of transitions according to different electrical signals. Embodiment 200 illustrates simple transition sequence including branching for a mono-stable pixel. Of particular interest are complex transitional sequences for polymorphic pixels including branching properties such as those illustrated in embodiments 900 and 1000.

Note that the conventional terms reversible and irreversible imply the ability, or lack of ability, of a pixel to reverse or switch back to a previous operating state. Polymorphic displays introduce the ability to electrically switch (with a switching signal) or self-switch (by terminating a maintenance signal) the operating state from one to another operating state that is other than the previous one. Note as well, that the transition sequencing property of polymorphic pixels can be produced using a variety of different polymers and combinations of them, e.g. with mixtures combining more than one type, or depositing more than one layer of them within the polymorphic pixel.

The ability to create different, fit-for-purpose transition sequences is an important benefit of polymorphic displays and as described below, of polymorphic pixels. Of particular benefit of the property of transition sequencing is the ability to selectively and dynamically determine and effect a transition sequence, and therefore the operable properties of a polymorphic pixel or polymorphic display, responsive to different electrical signals. And further, where the electrical signals are generated responsive to various conditions, events and actions etc., such as those common to intelligent display devices described later herein.

Polymorphic Displays

In its simplest embodiment, a polymorphic display is an electro-optic display comprising a single polymorphic pixel. More typically however, a polymorphic display is a unitary apparatus constructed having at least two pixels, the pixels having at least some of the following elements in common: structure, materials, circuitry, and optionally a display driver IC. As previously described, the display pixels may be of different types according to their operable properties.

The structure of a polymorphic display determines its physical form. The structure comprises for example, substrates, spacers, matrices, separators, spacers, barriers, sealants, transparent/viewing surfaces (e.g. 'windows') etc. typically, but not always, organized in layers that preferably lend themselves to high volume manufacturing processes (e.g., printing, spray casting, roll-to-roll manufacturing etc.). A polymorphic display's structure complements that of the electro-optic materials, other materials (e.g. adhesives) and electrical circuitry (including electrodes). For example, the electro-optic layers of different pixel types (e.g. electrochromics, LCDs, EPDs etc.) are often constructed with materials that are fluid or semi-solid and therefore that depend on various structures to hold them. And importantly, to reliably couple to the electrical circuitry.

A polymorphic display's electro-optic layer, and the pixels of which they are made, may share common materials. Such materials may for example be constructed as a single, continuous layer across multiple pixels, such as the electrolyte illustrated in FIGS. 5A and 10A. Alternatively, a material (e.g. the electro-optic material 710 of FIG. 5A and 1310 and 1320 of FIG. 10A) may be common to some but not all the pixels, and may be constructed as discrete, spatially separated elements within same physical layer (or the same manufacturing process). Such patterning advantageously allowing for other common materials to be interspersed among them.

As noted previously, a pixel comprises an electro-optic layer with electrodes either in direct contact with, or in close proximity to, the electro-optic layer. The electrodes are configured for applying electrical signals to the pixels individually or in groups and are typically formed on common structure (e.g. flexible substrates or layers). The electrodes may be configured in various ways including vertical (e.g. on the top and bottom surfaces of an electro-optic layer, interdigitated (both electrodes are on the same layer), or combinations of both. Typically, but not always, the electrodes on the side or sides of the electro-optic layer facing the viewing surface or surfaces, are transparent e.g. ITO or transparent, conductive silver-inks patterned on PET.

The pixel electrodes may be exposed for connection to circuitry of another device such as an intelligent display device describe herein. The electrodes may also be coupled to additional circuitry and components (e.g. display driver IC, backplane etc.) constructed as part of the polymorphic display apparatus (e.g. using common structure), for pixel addressing, signal management/noise reduction, visible verification (such as that described in U.S. patent application Ser. No. 14/927,098 Symbol Verification for an Intelligent Label Device, and Ser. No. 15/368,622 Optically Determining Messages on a Display) etc.

Figure 5B:
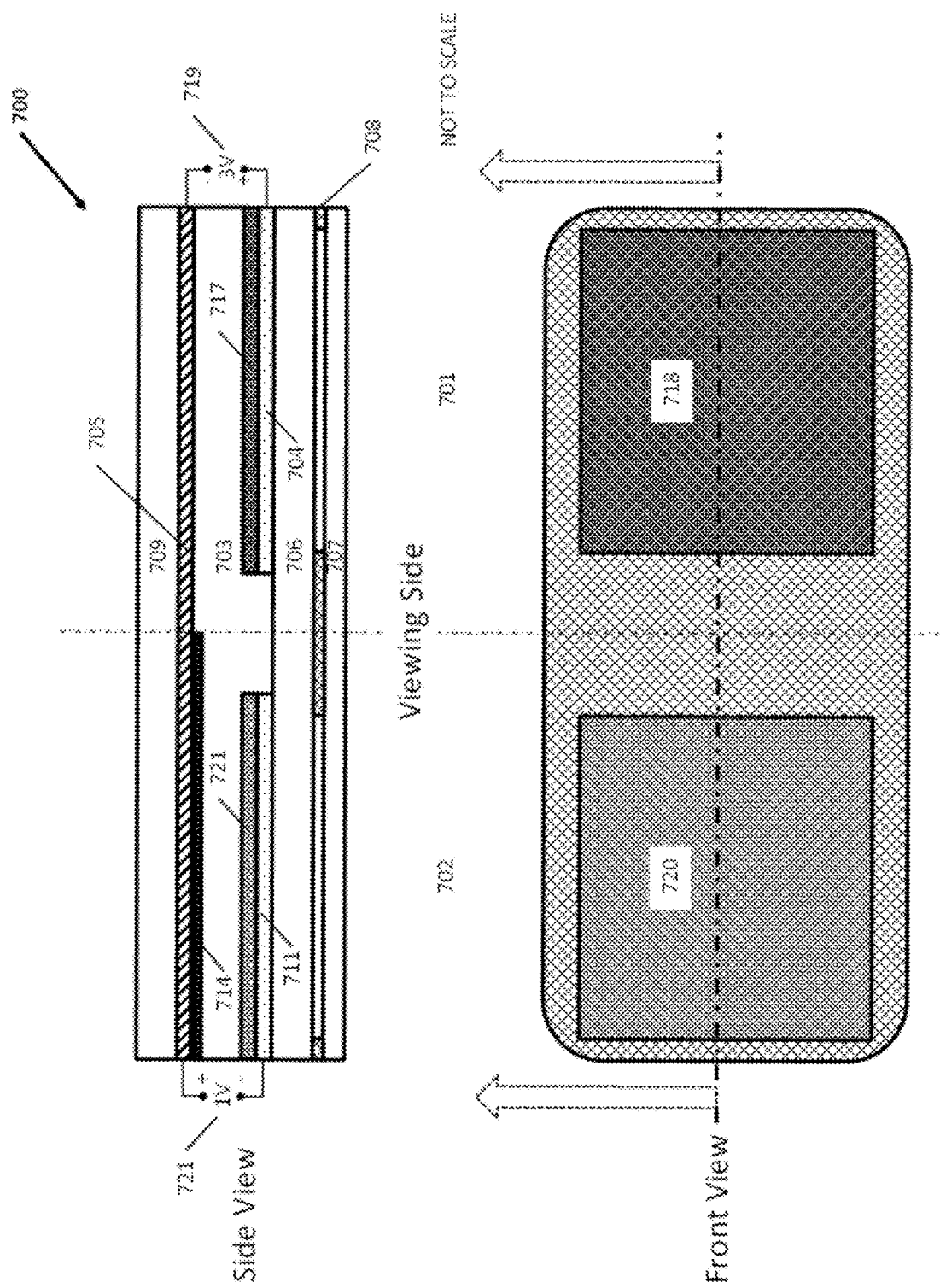
FIG. 5B is a block representative of a display in accordance with the present invention.
Figure 6A:
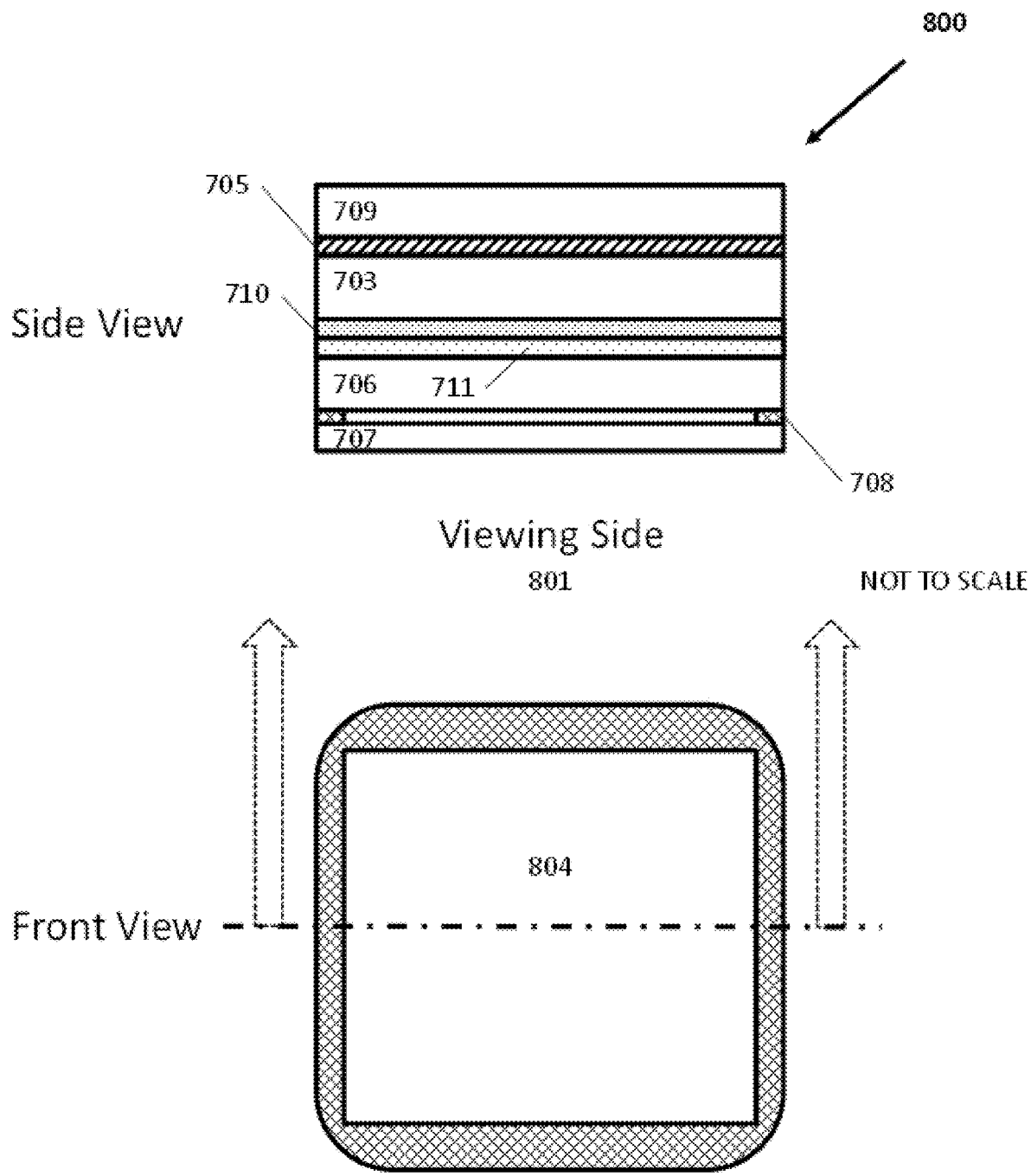
FIG. 6A is a block representative of a display in accordance with the present invention.
Figure 6B:
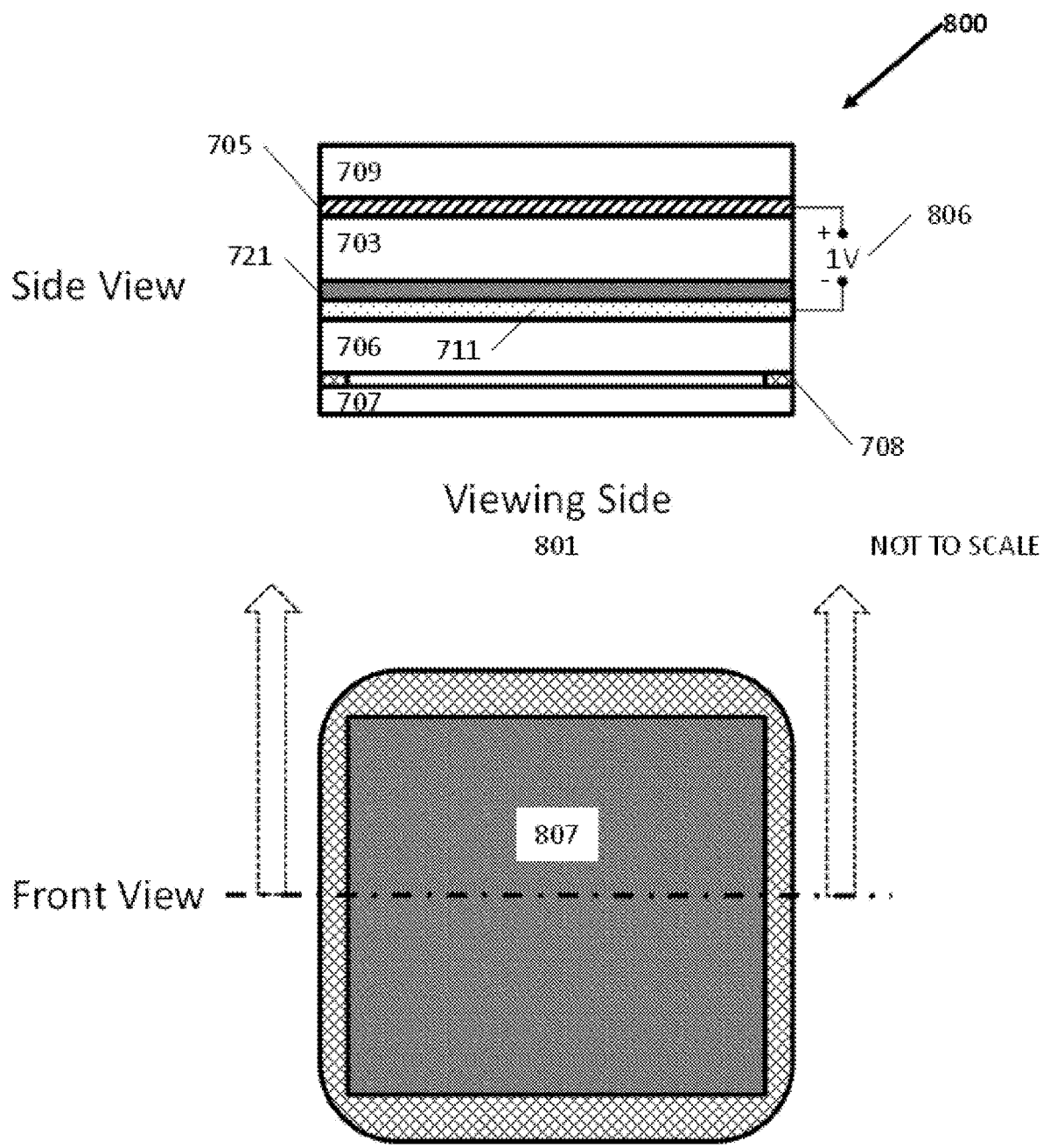
FIG. 6B is a block representative of a display in accordance with the present invention.
Figure 6C:
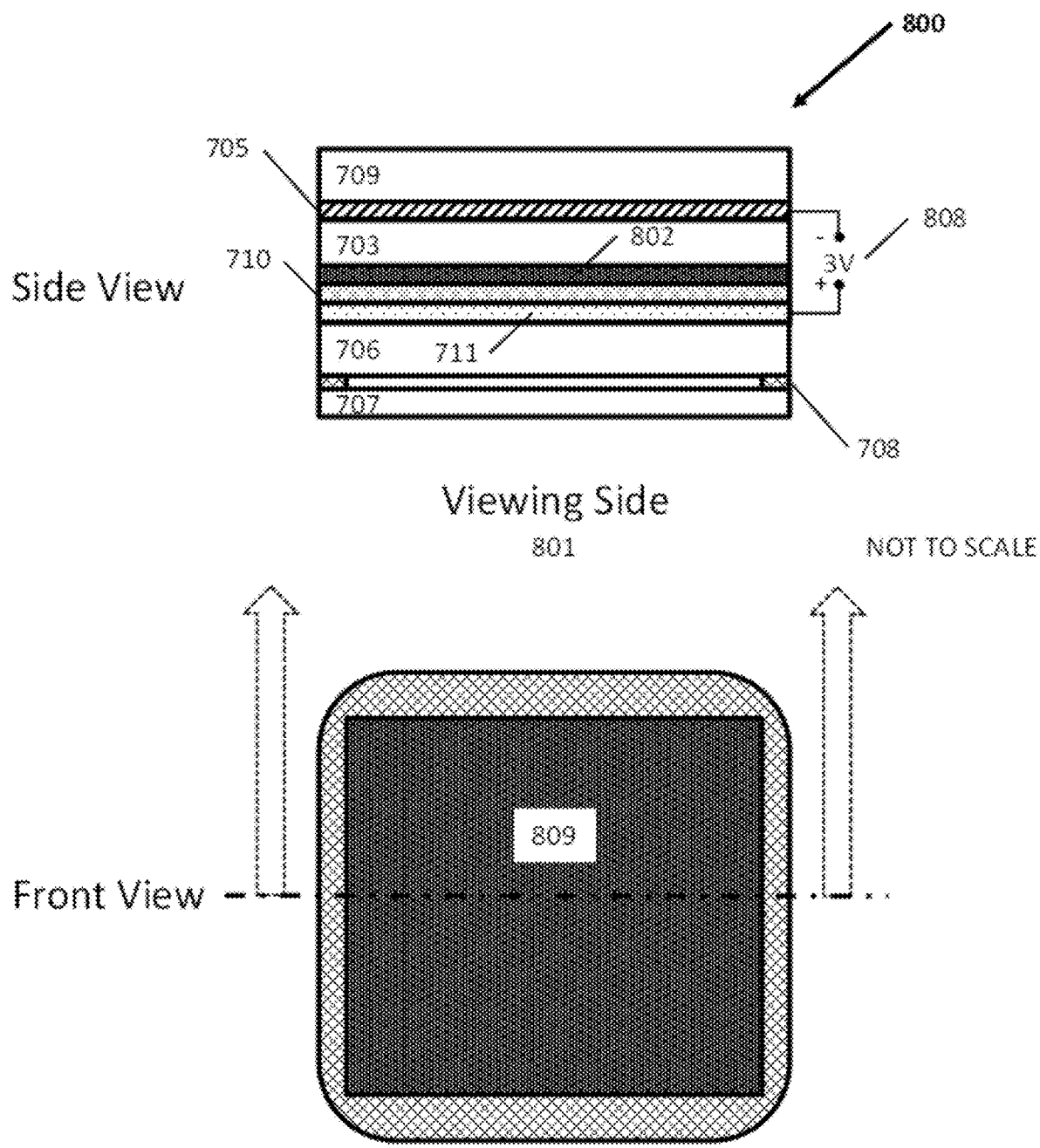
FIG. 6C is a block representative of a display in accordance with the present invention.
Figure 6D:
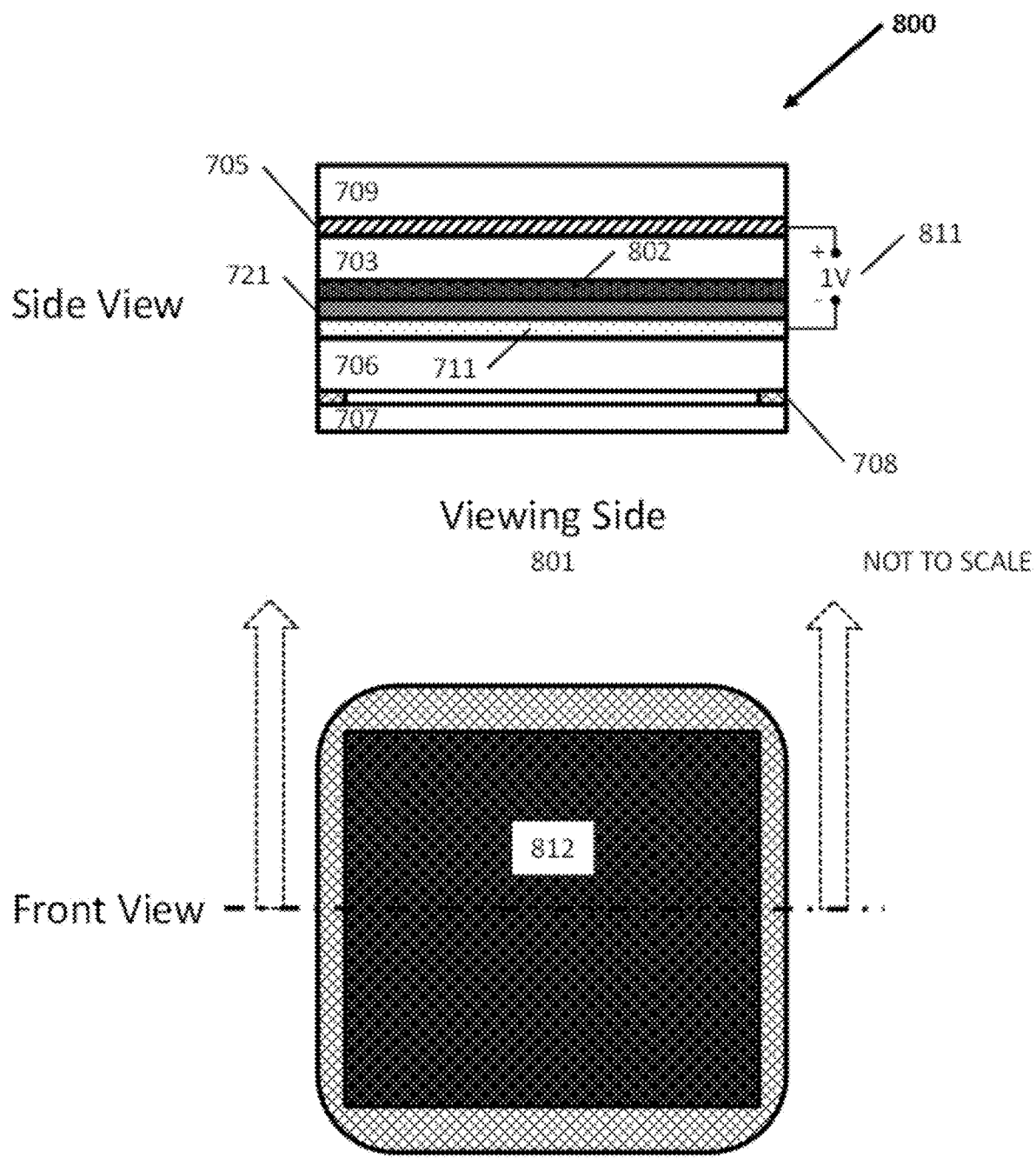
FIG. 6D is a block representative of a display in accordance with the present invention.
Figure 6E:
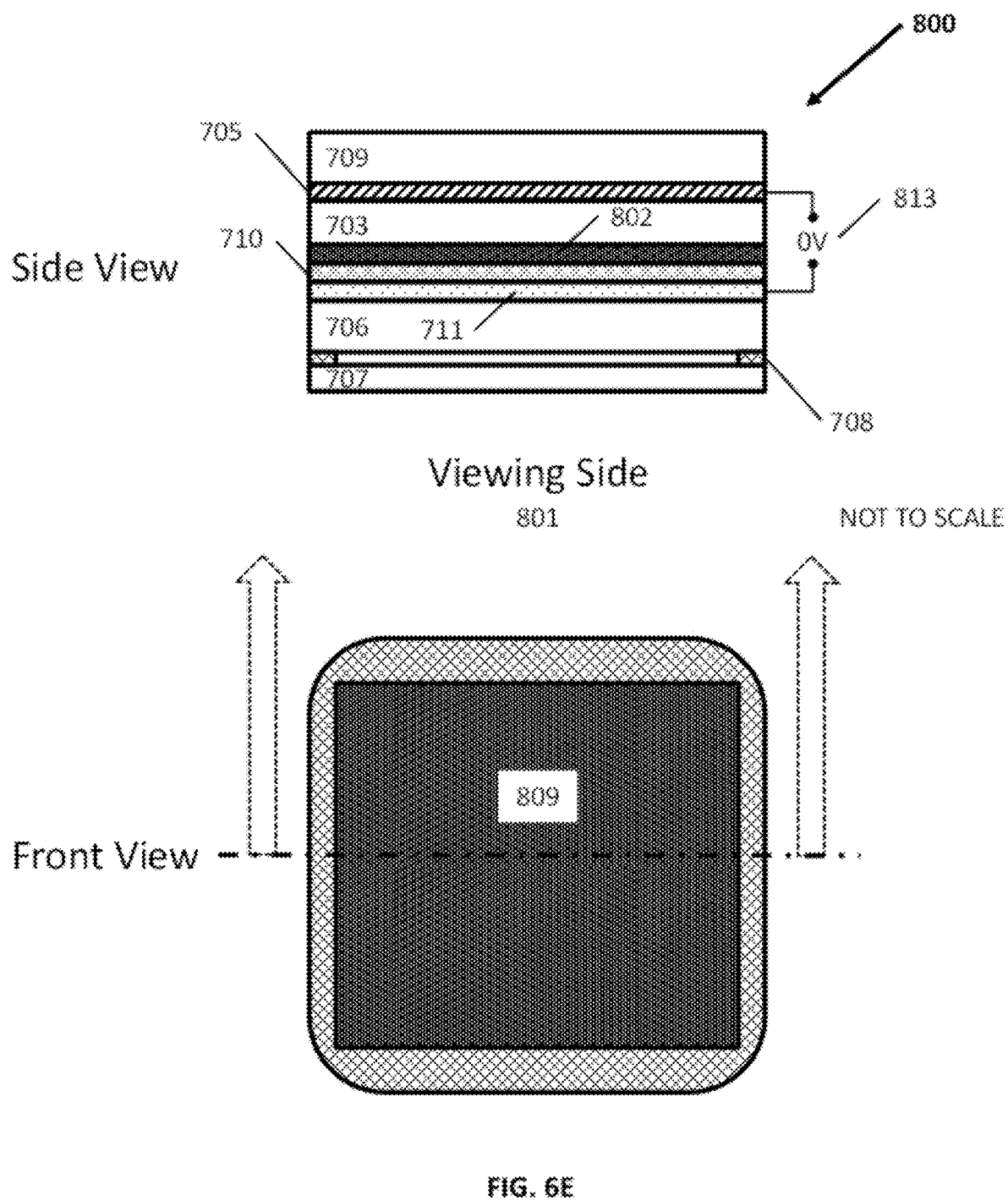
FIG. 6E is a block representative of a display in accordance with the present invention.
Figure 9A:
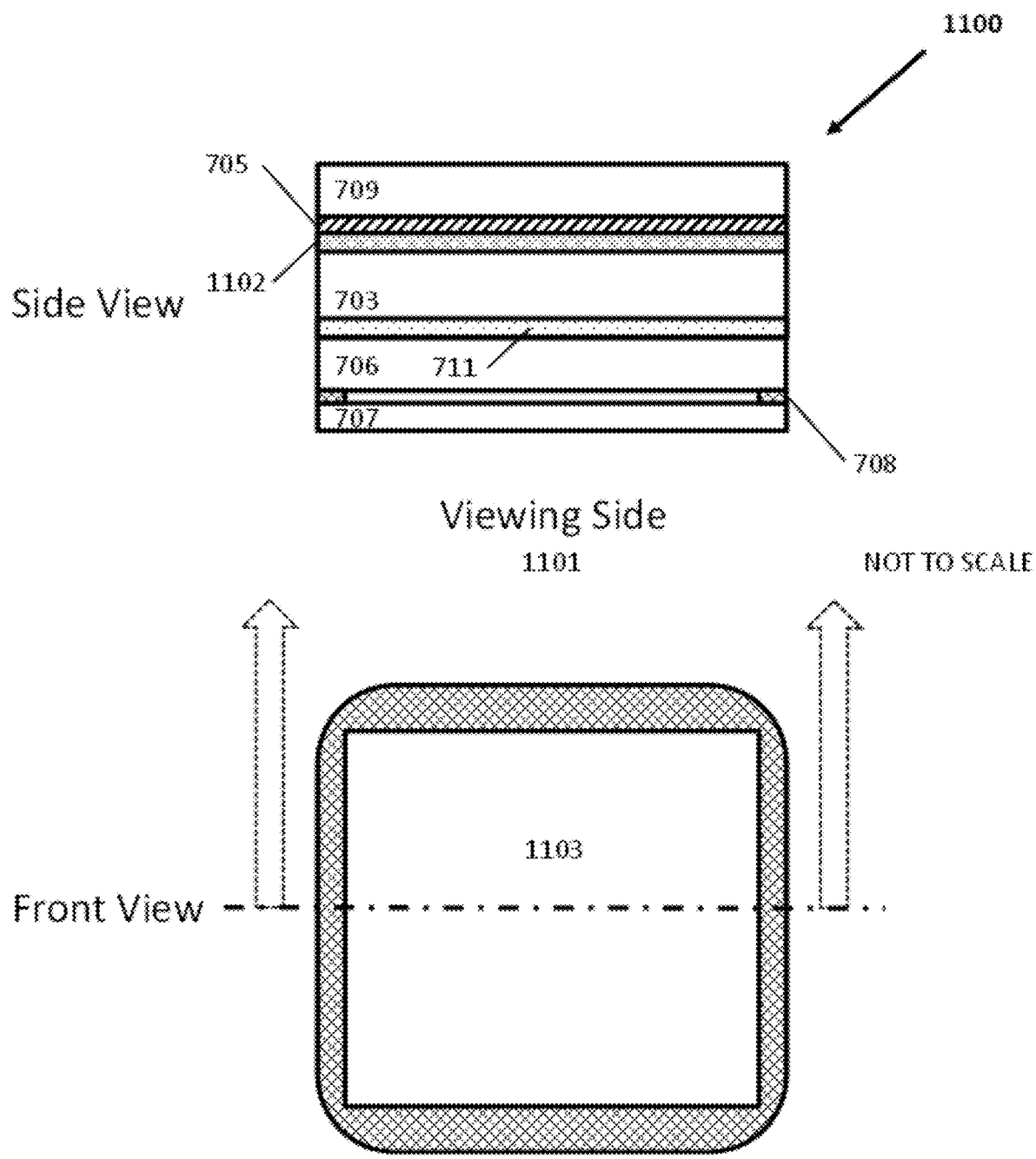
FIG. 9A is a block representative of a display in accordance with the present invention.
Figure 9B:
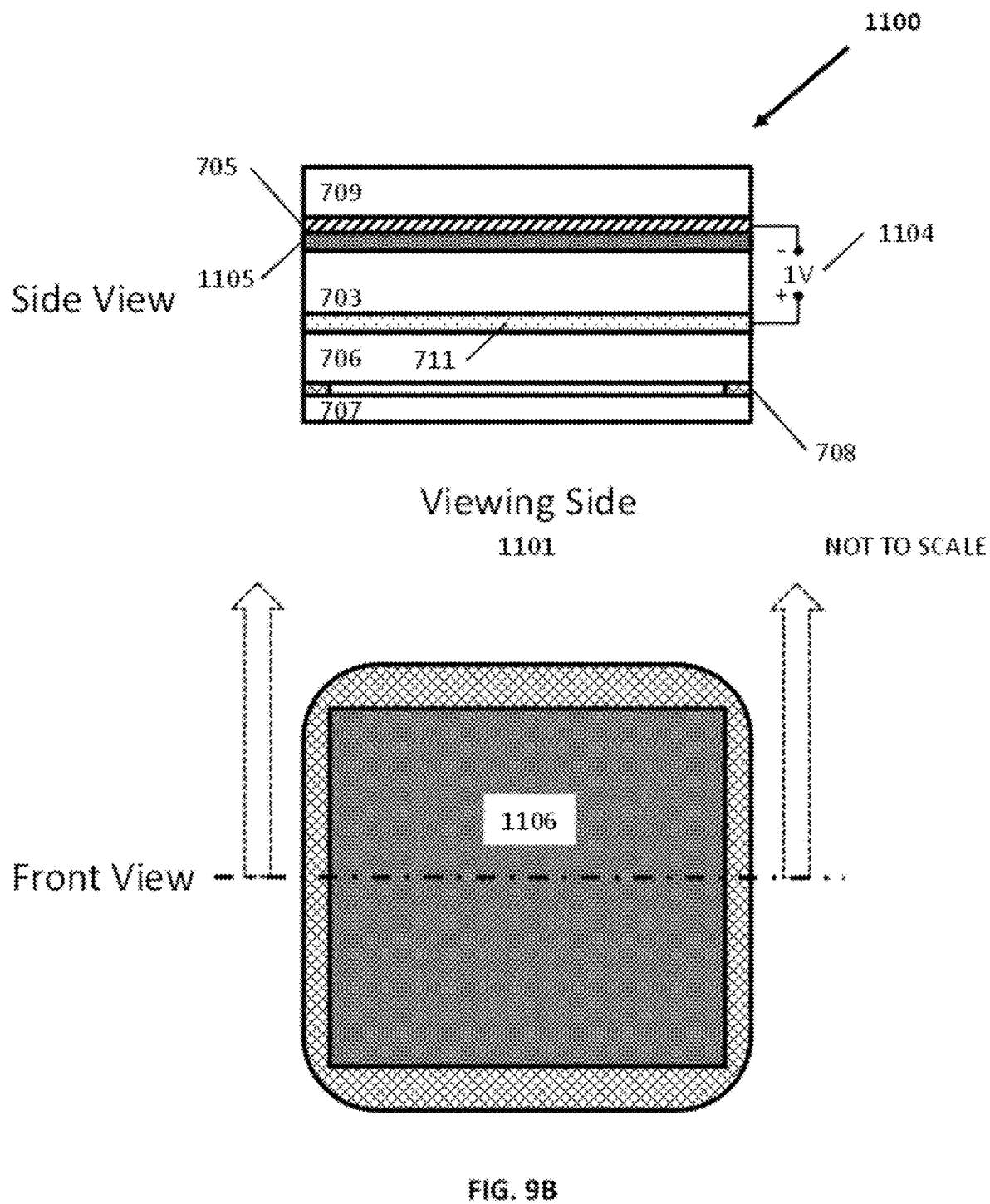
FIG. 9B and FIC. 9C are block representations of displays in accordance with the present invention.
Figure 9C:
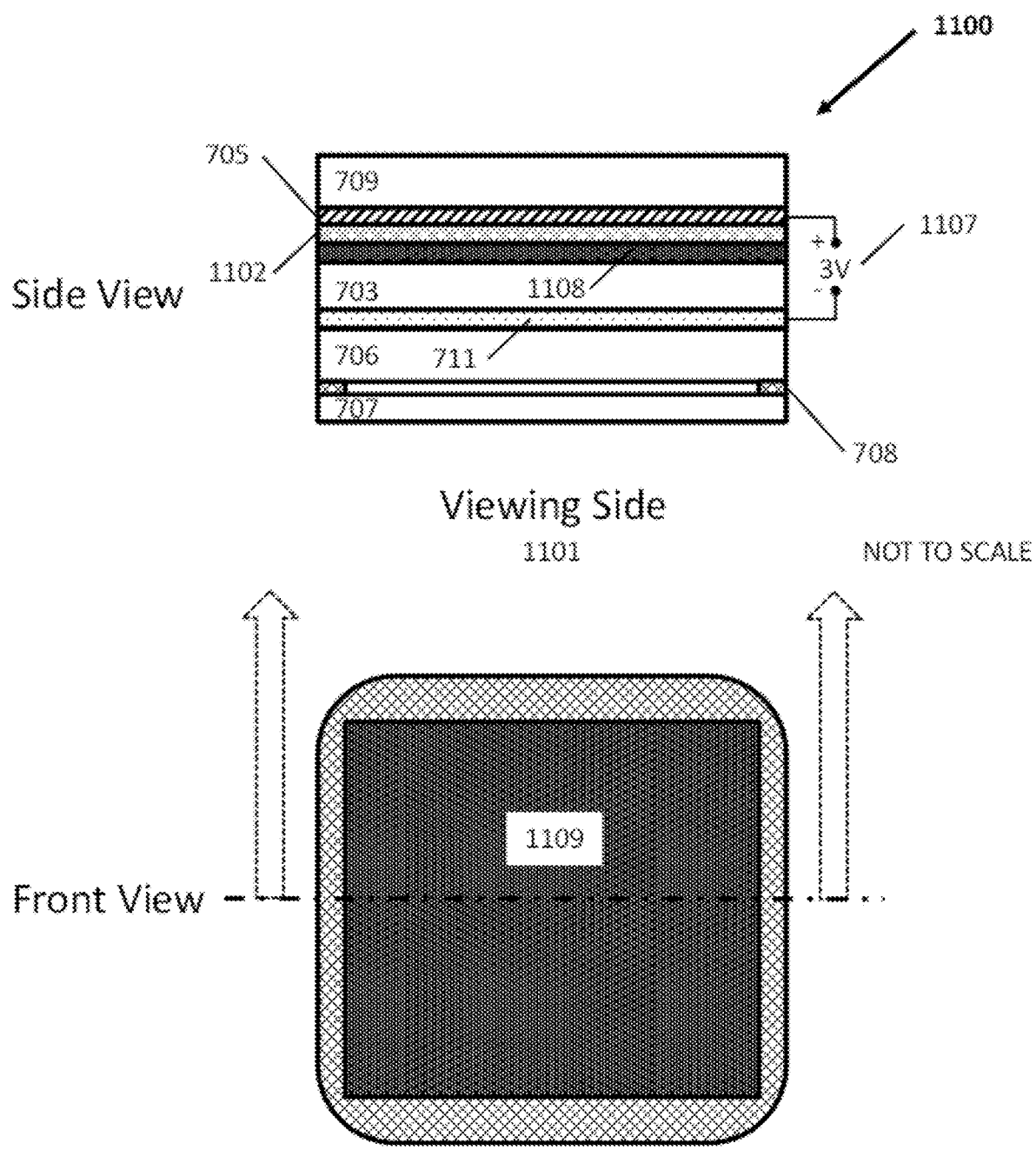
Figure 10A:
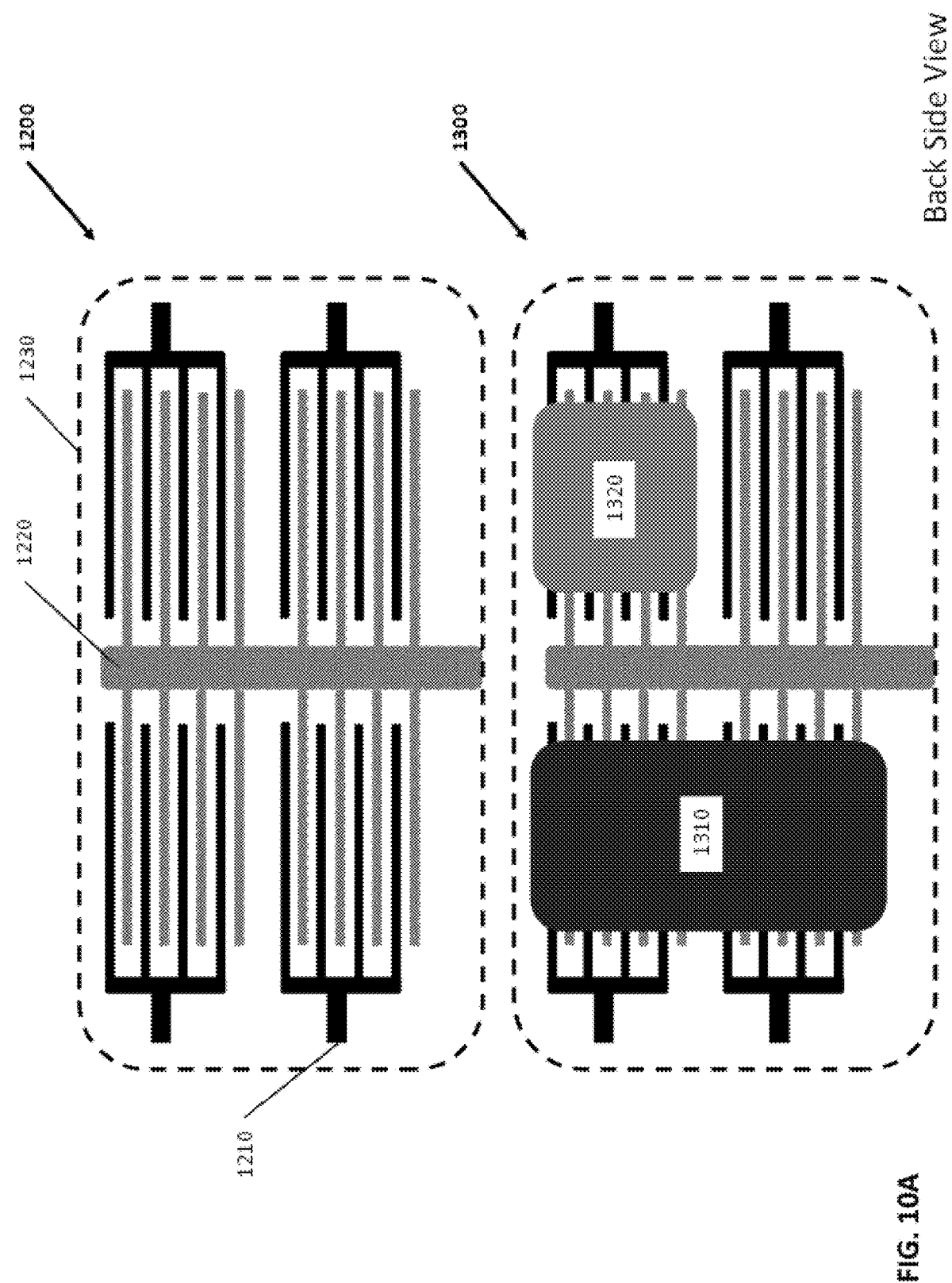
FIG. 10A is a block representative of a display in accordance with the present invention.

As illustrated in FIGS. 5A, 6A and 9A, exemplary display pixels 700, 800 and 1100 are configured with electrodes on the surfaces of the electro-optic layer (e.g. front and back). The electrodes however may be configured as interdigitated pairs located on a single surface. This may allow for simpler, lower cost manufacture, thinner devices, and in some cases may advantageously enable different operable and optical properties. And in some designs, interdigitated electrodes may work cooperatively with conventional surface electrodes. FIGS. 10A and 10B is an exemplary four-pixel structure employing interdigitated electrodes and different, patterned material layers to create pixels having different operable (and associated optical) properties. The viewing perspective is from the back of the structure. Note that the illustrations are intended only to focus on certain elements of a polymorphic display and not completed devices. Note further, the common material layers of which some are patterned and some continuous across the pixels.

The first layer 1200 of the four-pixel structure (viewed from the back) is a transparent substrate 1230 having interdigitated electrode 1220 and four companion electrodes 1210 (of which only one is numbered). Electrode 1220 is common to the four companion electrodes, all of which are collectively part of the display circuitry. Each of the interdigitated patterns are the foundation for four individual pixels. Structure 1300 shows layer 1200 with printed (or otherwise deposited) polymer 1310 and a different polymer 1320. Polymer 1310 spans two pairs of interdigitated electrodes so the corresponding pixels will have the same operable properties. Polymer 1310 covers a single electrode pair and the corresponding pixel will have operable properties different from the other three. Structure 1400 shows layer 1300 with a printed (or otherwise deposited) opaque electrolyte 1410. Electrolyte 1410 is an opaque EC mix. In this example, all three of the pixels with polymer layers will have the properties of being volatile, self-switchable. The fourth interdigitated electrode pair (the one without a polymer layer) will have the properties of being stable, switchable, irreversible and permanent. Structure 1500 is the same as structure 1400 with a transparent EC mix instead of the opaque EC mix 1410. This integrated, process friendly structure comprises four separately operable pixels, three having the properties of being volatile, self-switching (two of one type, and one of another) and one having the same operable properties of being irreversible and permanent.

Signal Protocol

A signal protocol is used by the processor to manage the different switching signals and maintenance signals according to the types of pixels which comprise the polymorphic display. The signal protocol provides the timing, duration, pattern (e.g. pulse shape, sequence), frequency, voltage or current, polarity etc. required by the processor to generate the appropriate signals.

Switching Signal

A switching signal is an electrical signal applied to a pixel for setting the operating states of the pixel (e.g. for switching from one operating state to another).

Maintenance Signal

A maintenance signal is an electrical signal applied to a pixel in a volatile state (self-switching) to maintain its current operating state. The maintenance signal is often different from the switching signal that switched the pixel to the current volatile operating state that is maintained by the maintenance signal.

Intelligent Display Device

An intelligence display device is an apparatus comprising a polymorphic display, and some or all of electronics, a power apparatus and appropriate to the application, a communication apparatus, sensors, and actuators. An intelligent display device is typically a unitary apparatus configured to be coupled or combined with a good or its packaging. Often, but not always, the intelligent display device is low cost, often disposable, low power and small in size. In some applications, though the intelligent display device is significantly larger and designed to present high-content messages or messages to be read by humans or machines at a distance. Exemplary configurations include labels, patches, tags, smart-cards, loyalty cards, packaging, containers, seals, caps, documents, test/sensing/monitoring devices, terminals, electronic-shelf labels, free-standing displays, electronics devices etc.

Electronics

In addition to a polymorphic display, intelligent display device includes electronic functions, for example, processor, memory, clock/timer, security, verification, communications and sensors, etc. that may be integrated into a single electronic device or implemented with discrete components.

The electronics will also typically include display driver circuitry configured to store and process appropriate data and algorithms (e.g. a signal protocol), temperature compensation etc. to generate the electricals to the polymorphic display and pixels it comprises. The display driver circuitry may be advantageously configured with the processor and memory or one or more separate components. And further, the display driver circuitry may be configured as part of the polymorphic display or as part of the electronic functions of the intelligent display device, or, distributed between the two.

Power Apparatus

The intelligent display device includes one or more power apparatus for powering the electrical functions in the intelligent label including a polymorphic display. Exemplary power apparatus include internal energy storage such as batteries or charged capacitors, wired interfaces capable of receiving electrical energy, wireless energy harvesters, or a combination thereof. The energy harvester for example, may produce electric energy from light (e.g. solar cell), RF energy (e.g., antenna/rectifier), thermal energy (e.g., thermopile), or shock and vibration (e.g. strain gauges, nanogenerators, MEMS devices) that the intelligent label device is subject to.

Communication Apparatus

Typically, the intelligent display device also has electronics that enable wireless or wired communication to or from the intelligent label. Exemplary wireless communication apparatus includes those that support Wi-Fi, Bluetooth, BLE, RFID (e.g. RAIN or NFC), ZigBee and other local area wireless networks, low power wide area (LPWN) and cellular and other wide area networks. Intelligent display devices may include support for portable memory chips, cards, sticks and other portable memory storage devices.

Sensors

An intelligent display device may have one or more sensors sensing the inside or outside environment (outside or inside the intelligent display device), the polymorphic display or other components or systems of the intelligent display device. Exemplary sensors include a temperature sensor, a humidity sensor, and altitude sensor, a pressure sensor, an optical sensor, a vibration sensor (including a shock sensor), a humidity sensor, biological or a chemical sensor (including a gas sensor, a pH sensor), a magnetic sensor, a smoke sensor, a radiation sensor etc. It will be appreciated that a wide variety of sensors could be used depending upon the particular application.

Actuators

Depending on the application, an intelligent display device, may have one or more actuators. Actuators activate, deactivate or otherwise effect control over electrical functions in the intelligent display device in response to external or internal stimulus, e.g. mechanical action, sensor input, electrical or wireless signals etc. Actuators may be used to activate different electrical functions at different times, e.g. when an item is shipped (the package is sealed) or when an item is received (the package is opened).

Actuators may also minimize power consumption, and thereby maximizing the shelf-life/operating life of intelligent display devices having internal power apparatus, by activating electronics only when appropriate to the application. Actuators, in cooperation with timers/clocks may also be used to establish the time/date an event occurs.

Exemplary actuators include mechanical switches (e.g. the open or close an electrical circuit), electro-optic, electrochemical, electro-mechanical and electro-acoustic devices, wired connectors (for receiving electrical signals), wireless receivers (for harvesting RF energy, receiving RF signals) etc., and are described in U.S. Pat. No. 9,471,862 An Intelligent Label Device and Method.

Example 1 (Polymorphic Display)

FIG. 5A shows an exemplary configuration of a polymorphic display 700 comprising two pixels, each having different operable properties, in side view and front view. For illustration purposes, only two pixels are shown although it is to be understood that a polymorphic display may comprise many such pixels. The right pixel 701 is bi-stable, having a bi-stable, permanent and irreversible second operating state (such as 200 in FIG. 2), whereas the left pixel 702 is mono-stable and self-switchable (such as 100 in FIG. 1).

In regard to bi-stable pixel 701, detailed embodiments of bi-stable, permanent and irreversible display devices and pixels, are disclosed in U.S. Pat. No. 9,030,724 Flexible and Printable Electrooptic Devices. For simplicity, only the key aspects pertaining to the configuration and function of such pixels within a polymorphic display are described herein and presented in 700 in FIG. 5A. Exemplary embodiment 700 consists of an electro-optic layer 703 further including an electropolymerizable monomer, an electrolyte (e.g. ionic liquid), and (optionally) highly reflective particles (e.g. $TiO_2$) collectively, here and throughout, referred to as an "EC mix" ("electrochromic mixture"). The EC mix as illustrated is of a substantially uniform composition. The electro-optic layer 703, in this example, the EC mixture, is sandwiched between a pair of electrodes; a front electrode 704 and a back electrode 705. The front electrode is at least partially transparent (e.g. ITO) and configured on a substantially transparent substrate 706 (e.g., glass, plastic, etc.) and is advantageously sealed with a barrier/protective layer. The back electrode 705 and back substrate/barrier 709 may both either be transparent (for front and back side viewing of the display) or opaque (front side only viewing).

An advantageous mono-stable pixel 702 is now described that is complementary to the exemplary bi-stable pixel 701. Mono-stable pixel 702 uses a conjugated (conductive) polymer film 710 that can switch reversibly between two distinctly different operable states when the polymer is in contact with an electrolyte (such as the one contained in the EC mix 703). The operable states correspond to a conductive (oxidized chemical) state and an insulating (neutral or reduced chemical) state according to the presence of a switching signal followed by a maintenance signal, or the termination or disruption of the maintenance signal. In the presence of an electrical switching signal, the pixel 702 transitions from a stable, first state to a volatile second state. The pixel remains in the volatile second state for the duration of the maintenance signal. When the maintenance signal is terminated (or disrupted for any reason) the pixel self-switches (transitions back) to the stable, first state.

Note that the EC mix 703 of pixel 701 comprises an electrolyte that can function as the electrolyte for pixel 702. The monomer and other materials in the EC mix do not prevent the electrolyte from use in both pixels. Furthermore, as illustrated in FIG. 5A, the two pixels can have in common electrode 705, top and bottom substrates 706, 709, and barrier/protective layer 707. Additionally, they can share a common, patterned electrode layer (and manufacturing process) comprising the pixel's respective front electrodes 704 and 711. They can also share mask layer 708 described below. Not shown is the structure that would encapsulate the entire apparatus (e.g. the side barrier/protective structure) and the appropriate display driver circuitry with connections to the pixel electrodes.

In summary, polymorphic display 700 is a unitary apparatus comprising two pixels, each a different type according to their respective operable properties (bi-stable, permanent and irreversible, and mono-stable), and further that have in common, structure, materials and circuitry.

As noted above, the two pixels 701 and 702 share a single, common electrolyte layer. Furthermore, the switching voltages for the polymer films in the mono-stable pixel 702 are typically significantly lower (near 1V) than that typically required for electropolymerization (near 3V) in the bi-stable pixel 701. This provides an upper threshold means to keep the monomer in the EC mix from electropolymerizing yet allowing the self-switching polymer 710 to switch between operating states by applying a switching signal followed by applying and then terminating maintenance signal across the common back electrode layer 705 and the front electrode 711. Although, the front electrodes, 704 and 711, for the two operable pixel types of the polymorphic display 700 can be made of different (transparent conductor) materials, it is preferably made of the same material by patterning a single front electrode layer deposited onto the single substrate 706. Depending on the locations of the address lines/circuitry to the pixel electrodes of the display (not shown in FIG. 5A), while providing a high display contrast (dark background of the pixel openings), it may be advantageous to mask certain areas by an opaque, light absorbing material 708.

Of particular interest are self-switching mono-stable electrochromic polymers having one stable and one volatile operating state, and two corresponding optical states. These self-switching polymers may be divided into two groups according to their chemical properties corresponding to their operable properties.

One group of electrochromic polymers are switchable from a stable, un-powered operating state corresponding to an oxidized chemical state, and a corresponding clear optical state, to a volatile, self-switching operating state corresponding to a neutral chemical state, and a corresponding colored optical state, and self-switching back to the stable, un-powered operating state and corresponding oxidized chemical state, and corresponding clear optical state. Exemplary polymers of this type include dioxythiophenes (e.g. certain XDOT, such as PProDOT, PEDOT).

Another group of electrochromic polymers are switchable from a stable, un-powered operating state corresponding to a neutral chemical state, and a corresponding first, colored optical state, to a volatile, self-switching operating state corresponding to an oxidized chemical state, and corresponding second, colored or predominately clear optical state, and self-switching back to the stable, un-powered operating state and corresponding neutral chemical state, and corresponding first, colored optical state. Exemplary polymers of this type include thiophene based polymers (e.g. poly(methylthiophene)).

It should be noted that it is possible to achieve various color combinations by blending of two or more of such polymers within the same group and further switching them according to their specific threshold voltages. Additionally, and apart from electrochromic polymers, certain other materials including those based on transition metal oxides or derivatives of bipyridinium, such as, viologen, are self-switching. For instance, viologen can be adsorbed by a porous material, such as nanoparticle-based $TiO_2$, to form an active layer (e.g. in place of the polymer layer 710), or added to the EC mix 703, and may additionally function or co-function as the electrolyte.

It may further be advantageous to include an optional layer (also known as a charge storage layer) consisting of a complementary conducting polymer material 714 on the counter (back) electrode 705, to facilitate the self-switching process and/or to add additional material layers to protect the counter (back) electrode 705 from the electrolyte 703. Examples of such polymers include anodically coloring polymers, such as XDOPs (dioxypyrroles) or alternating copolymers of XDOT and carbazoles such as PEDOT-NMe (Cbz), and cathodically coloring polymer such as XDOTs such as PEDOT or PProDOT, which self-switch to an oxidized state. Cathodic materials may also be deposited to protect a bare counter electrode including derivatives of bipyridinium, such as viologen, and anthraquinone and its derivatives in solution. An opaque or reflective (e.g. $TiO_2$ additive) EC mix may mask the electrochromic characteristics of the above materials, or they may be intentionally included in the resulting optical states as seen from the front side or back side (for a two-sided display).

Self-switching polymer films are typically prepared by spray casting 5 mg/mL polymer solutions in toluene. When cured, the deposited layer may become a film less than sub-micron thick. Self-switching polymers may be deposited onto the electrode using a variety of methods including: spray, spin, or drop casting neutral electrochromic polymer solutions; printing technology such as inkjet printing; dip casting from solution; and oxidative chemical vapor deposition of conducting polymer films or electrochemical deposition. The properties of self-switching polymer films may further be manipulated through a chemical defunctionalization step rendering the film less soluble, allowing for deposition of additional layers such as the layer of EC mix 703.

Referring again to FIG. 5A, an individual pixel of the polymorphic display 700 is switched by an electrical signal applied to its corresponding electrode pair (704 and 705 or 711 and 705). Initially, both the states of the bi-stable pixel 701 and the mono-stable pixel 702 are stable and each having a first, white optical state, 712 and 713, as determined by the reflective $TiO_2$ of the EC mix and the transmissive property of the electrochromic polymer layer 710. Further, initially the corresponding voltages across each respective electrode pair is 0V (715 and 716).

FIG. 5B illustrates the respective optical states 718, 720 of the polymorphic display 700 after application of respective independent switching signals. The switching signal for irreversibly transitioning the bi-stable pixel 701 into an irreversible and permanent operating state (e.g. dark blue optical state) can be accomplished through a variety of switching protocols such as those disclosed in U.S. Pat. No. 9,030,724 Flexible and Printable Electrooptic Devices and U.S. provisional patent application Ser. No. 14/797,141 Device and Method to Fix a Message on a Display, including e.g. applying a voltage above a certain threshold (as indicated by 719 of e.g. 3V) for a defined time duration (e.g., 2s). Note that the anode typically is the (front) electrode 704 such that the polymerized monomer 717 is (anodically) formed on or at the electrode, displacing the (white) EC mix and further providing a substantial change of color (e.g. from white to dark blue as observed from the viewing side. After the switching is complete, the operable (and optical) state will remain as it is permanent and irreversible.

The switching signal for reversibly transitioning the mono-stable pixel 702 into a volatile operating state (corresponding, e.g., to a red color of the polymer layer 721 resulting in a red optical state 720 of the pixel) can be accomplished by, for example, applying a voltage above a certain threshold (as indicated by 721 of e.g. 1V) for a defined time duration (e.g., 1s). Note that the cathode is the front electrode 711 in case of electrochromic polymers providing chemically neutral (reduced) volatile states (as shown in FIG. 5B) and oxidized stable states (as shown in FIG. 5A) whereas the anode is the (front) electrode in case of electrochromic polymers providing chemically oxidized volatile states and neutral stable states. After the switching is complete, a maintenance signal is applied with the same effective polarity as the switching signal, in order for pixel to maintain its current state. Upon termination or disruption of the maintenance signal the volatile state will self-switch back to its original white state (713 in FIG. 5A). It should be noted, that depending on the deposition method employed of the electrochromic polymer layer in manufacture of the polymorphic display, some cycling ("break-in") between the reversible states of the self-switching polymer may be advantageous to achieve faster switching times and/or higher color saturation. This is in particular applicable to deposition processes not providing for intercalated electrolyte within the polymer layer.

Example 2 (Polymorphic Pixel)

In this exemplary embodiment polymorphic functionality is achieved in a single pixel, called a polymorphic pixel. Note that multiple (two or more) polymorphic pixels with the same operable properties can also form a polymorphic display, as discussed above.

FIG. 6A illustrates an exemplary embodiment 800 of a polymorphic pixel 801, in side view and front view. The pixel 801 follows the same vertical structure configuration as that of pixel 702 shown in FIG. 5A, and will thus not be described in detail except wherein there are differences that pertain to the polymorphic functionality. To this end, and for simplicity, the (optional) complementary conducting polymer material 714 is not shown and the EC mix 703, which together with the conducting polymer layer 710 form the electro-optic layer, initially will be assumed to contain highly reflective particles (e.g. $TiO_2$) as an additive to the otherwise natively transmissive (clear) EC mix. Further, the polymer layer 710 is assumed be self-switchable, comprising an initial stable, clear optical state and a corresponding oxidized chemical state, switchable to a volatile red optical state with a corresponding reduced chemical state. A polymer which such characteristics includes, e.g., poly{3,4-di(2-ethylhexyloxy)thiophene-co-3,4-di(methoxy)thiophene}.

The functionality of the polymorphic pixel 801 will now be described with reference to the corresponding structure FIGS. 6A-E, and FIG. 7 illustrating the operable states 900 through its applicable switching sequences along branches 902 and 903.

Analogously to pixel 702, the initial (i.e., before any application of an electrical signal to its front 711 and back 705 electrodes) operable state 905 of pixel 801 is stable with a corresponding white optical state 804 (FIG. 6A), as determined by reflected light from the $TiO_2$ particles of the EC mix 703 transmitted through the clear polymer layer 710. After providing a switching signal (along branch 902) as indicated by 806 in FIG. 6B, the operable state of the pixel switches to a volatile state 906 with a corresponding red optical state 807. As previously discussed, this optical state will remain for the duration of the maintenance signal, after which it will self-switch back to its operable state 905.

The pixel 801 will remain in a self-switchable state along branch 902 as long as the switching signal level does not exceed the threshold (e.g. 3V) for electrochemical polymerization of the monomer in the EC mix 703. If, however, the applied voltage reaches the threshold voltage, with the front electrode 711 being the anode, the monomer polymerizes 802 (FIG. 6C) onto (or near) the self-switchable polymer layer 710. Note that during the switching the polymer layer 710 is in an oxidized chemical state, clear optical state, and electrically conductive state, which facilitates the polymerization process. After applying a switching signal (along branch 903) as indicated by 808, the operable state of the pixel switches irreversibly to a stable state 908 with a corresponding, e.g., dark blue optical state 809. This optical state is determined by the color of the polymerized layer 802. Note that after the switching is complete, the self-switchable polymer layer will remain in a clear state.

It is important to further note that even though operable state 908 sequenced irreversibly from state 905, the pixel is now in a mono-stable and self-switchable operable state, as further applying a switching signal 811 (FIG. 6D) with a continued maintenance signal results in a volatile state 910 with red color of the self-switchable polymer layer 721. Accordingly, the resulting optical state 812 will generally be a combination of 721 (here, red) and 802 (here, dark blue). For instance, and in this particular case, if layer 721 is relatively thick, the optical state will be a predominantly red color; if layer 721 is relatively thin (i.e. largely transmissive), the optical state will closely match the dark blue color of layer 802; or, if 721 has a thickness somewhere in the middle, the color may be a compound purple. Again, after removal of the maintenance signal, indicated by 813 in FIG. 6E the pixel will self-switch back to operable state 908 (and corresponding optical state 809).

Figure 8:
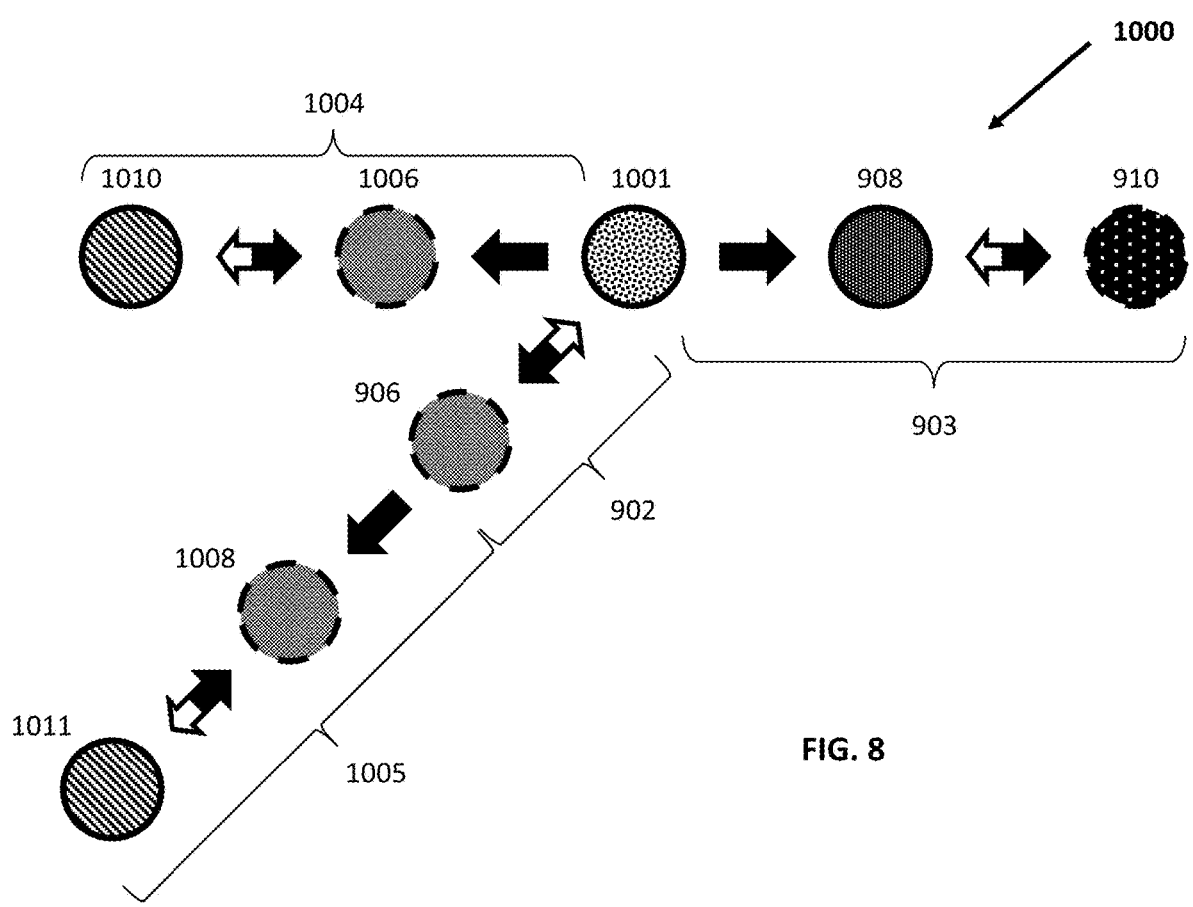
FIG. 8 is a diagram showing operable states and corresponding optical states for a display in accordance with the present invention.

In an alternative embodiment of pixel 800, the reflective $TiO_2$ particles are not included in the EC mix 703 resulting in a transmissive (clear) optical property. This alters the optical state of the initial operable state 904, depending on the reflective properties of the back electrode 705. In this alternative embodiment the back electrode 705 is presumed light absorbing (e.g. carbon black) resulting in an initial optical state of black as illustrated by 1001 of the operable states of this embodiment 1000 in FIG. 8. However, the operable and optical states of the other states along branches 1002 and 1003 are the same as those illustrated and discussed in FIGS. 7, 902 and 903, respectively (here assuming, for simplicity, that layers 721 and 802 are largely reflective, and the yellow tint of the EC mix 703 does not contribute).

However, this particular embodiment enables additional operable states by analogously polymerizing the monomer of the EC mix onto (or near) the back electrode by applying an opposite polarity of the switching signal onto the pair of electrodes. These additional operable states are shown along an extended branch indicated by 1005, as well as, an additional third branch 1004, with operable states as indicated. Note that the volatile optical states 1006 and 1008 are the same as 906, and that the stable optical states of 1010 and 1011 are virtually the same as 908 (ignoring any effect of viewing through the transmissive EC mix).

In a further alternative embodiment of pixel 800, the reflective $TiO_2$ particles are again not included in the EC mix 703, but an inert dye (here assumed yellow) is added resulting in a corresponding yellow tint of the EC mix. In this further alternative embodiment the back electrode 705 is presumed light reflective. Advantageously, the concentration of the dye is such that light will be reflected through a double pass of the pixel stack yielding, in this case, an initial yellow optical state 1001. Note that for this embodiment all other optical states remain the same as above except for states 1010 and 1011, which will have a new optical state of green, resulting from the dark blue polymerized layer on the back electrode viewed through the yellow tinted EC mix. Thus this configuration can exhibit five different optical states, three stable states and two volatile states, with a variety of operable properties including irreversible and mono-stable states.

Example 3 (Polymorphic Pixel with Non-Switchable Operable State)

FIG. 9A illustrates another exemplary embodiment 1100 of a polymorphic pixel 1101 with a non-switchable operating state, in side view and front view. The pixel 1101 follows the same vertical structure configuration as that of pixel 801 shown in FIG. 6A, and will thus not be described in detail except wherein there are differences that pertain to the polymorphic functionality. To this end, the reflective $TiO_2$ particles are not included in the EC mix 703 resulting in a transmissive (clear) optical property. Further, the polymer layer 1102 is again assumed be self-switchable, comprising an initial stable, clear optical state and a corresponding oxidized chemical state, switchable to a volatile red optical state with a corresponding reduced chemical state. However, the self-switching polymer layer 1102 is present on the back electrode 705 (as opposed to the front electrode 711 as in FIG. 6A). Additionally, the back electrode 705 is reflective or transparent with an additional diffuse reflective layer behind it (not shown in FIG. 9A).

The functionality of the polymorphic pixel 1101 will now be described with reference to the corresponding structure FIGS. 9A-C, and FIG. 4 illustrating the operable states 600 through its applicable switching sequences along branches 601 and 602.

Analogously to pixel 801, the initial (i.e., before any application of an electrical signal to its front 711 and back 705 electrodes) operable state 610 of pixel 1101 is stable with a corresponding white optical state 1103, as determined by reflected light from back electrode 705. After providing a switching signal (along branch 601) as indicated by 1104 in FIG. 9B, the operable state of the pixel switches to a volatile state 620 with a corresponding red optical state 1106. As previously discussed, this optical state will remain for the duration of the maintenance signal, after which it will self-switch back to its initial operable state 610.

The pixel 1101 will remain in a self-switchable state along branch 601 as long as the switching signal level does not exceed the threshold (e.g. 3V) for electrochemical polymerization of the monomer in the EC mix 703. If, however, the applied voltage reaches the threshold voltage, with the back electrode 705 being the anode, the monomer polymerizes 1108 (FIG. 9C) onto (or near) the self-switchable polymer layer 1102. Note, again, that during the switching the polymer layer 1102 is in an oxidized chemical state, clear optical state, and electrically conductive state, which facilitates the polymerization process. After applying a switching signal (along branch 602) as indicated by 1107, the operable state of the pixel switches irreversibly to a stable state 630 with a corresponding, e.g., dark blue optical state 1109. This optical state 630 is determined by the color of the polymerized layer 1102 as the EC mix 703 is transmissive. Note, again, that after the switching is complete, the self-switchable polymer layer will remain in a clear state. However, in contrast to Example 1 above, this operable state does not allow for any further switching affecting the corresponding optical state 1109, thus it is in an operable state which is non-switchable.

Example 4 (Interdigitated Electrode Structure)

In the exemplary embodiments discussed above, the electrode layers for switching the electro-optic layers have been focused on non-patterned configurations with either transparent or opaque optical properties. However, in some cases it may be advantageous to use an interdigitated pair of electrodes. Such configurations enable a single patterned electrode layer instead of two separate non-patterned electrode layers simplifying the manufacturing process of polymorphic pixels and displays. Furthermore, this allows for two activation surfaces per interdigitated electrode pair in a single layer with a multitude of operable states. Note that such an interdigitated transparent electrode structure (e.g. ITO) can also be employed on both sides of the electro-optic layer, e.g., for a two-sided display.

FIG. 10A shows (in a back side view) a conceptual electrode layout 1200 consisting of four pairs of interdigitated electrodes (corresponding to four pixels of the completed polymorphic display). In this configuration one digitated electrode of each of the four pairs is (optionally) connected to a common electrode connection 1220. Thus any particular pair of electrodes can be addressed using the common electrode 1220 and a pixel specific digitated electrode (e.g. 1210).

Typically the interdigitated electrode layer is deposited (e.g. directly printed or by patterning of a uniform film using, e.g. photolithography or laser ablation) onto a substrate 1230 (outlined). This process is further followed by deposition (e.g. printing) of one or more self-switching polymers (all in the same layer), such as shown in 1300 by a first self-switching polymer 1310 and a second self-switching polymer 1320. Note that the deposition can continuously span of more than one electrode pair (such as in the case of 1310).

Advantageously, the widths and separation of the electrode digits are optimized with respect to the particular properties of the self-switching polymer (e.g. thickness) and switching protocol. However, also depending on these properties, it may be preferable (e.g. for better color contrast) to only deposit (e.g. print) the self-switchable polymer along the electrode digits (i.e. with gaps), and further only on one side of the interdigitated pair (a complementary polymer layer may optionally be deposited on the other side of the interdigitated pair).

After completion of the self-switching polymer layer, the EC mix layer can be deposited (e.g. by a further printing process), as shown by layer 1410 in FIG. 10B. In this particular case, the EC mix is opaque (white, containing $TiO_2$ particles), however, it may also be transparent (without $TiO_2$ particles) as shown in 1500 by layer 1510. Note that the EC mix can also be deposited onto select pixels using different EC mix compositions (e.g. a different monomer polymerizing to a unique color). Furthermore, depending on the operable states desired for the polymorphic display, some pixels may only have an electrolyte printed on top (i.e. no EC mix).

The above examples disclose embodiments of polymorphic displays and pixels with various operable states corresponding to optical states determined by reflective properties of the pixels. However, the method and means can advantageously be extended to transmissive and/or polarization properties. For example, the self-switching polymer or polymerized monomer layers can be designed (with appropriate activation protocols) such that the transmitted light through (the colored layers in) the pixels determine the optical state. In this case, both the back electrode and substrate are at least partially transmissive as well. Advantageously, electrochromic materials could be combined with a liquid crystal material to from an electro-optic layer capable of generating both polarization and color changes to transmitted light through the layer (with corresponding operable states). Optionally, polarizers in front and behind the electro-optic layer (e.g. on the outer surface of front (and back, if transmissive) substrate or cover layer, could, e.g., convert the polarization changes to light intensity changes.

Additionally, the above exemplary embodiments primarily working in the visible wavelength range. However, as discussed above, the embodiments of the current invention also include wavelength outside of the human visible range (e.g. machine reading). Advantageously, as electrochromic polymers typically exhibit significant reflectivity changes in the IR wavelengths between the oxidized (conductive) and reduced (non-conductive) states, these materials can thus also be utilized for generating operable state changes outside of the visible range for polymorphic pixels and displays.

Example 5 (Polymorphic Display—Fixed-Image Shutter Mode)

FIG. 12A-D illustrates another embodiment of the current invention in side view and front view, in which the pixels of a polymorphic display 1600 operates in a shutter mode (i.e., a means for either transmitting or reflecting/absorbing light). This embodiment is similar to that illustrated in FIG. 5A, thus only differences will be highlighted. The EC Mix 703 spanning both the right pixel 1601, with a bi-stable, permanent and irreversible second operating state, and the left pixel 1602, which is monostable and self-switchable, is predominantly transparent (i.e., without any TiO2 in the EC Mix). Although the (optional) complementary conducting polymer material 714 of FIG. 5A is not shown, it should be noted that the complementary conducting polymer material 714 can be patterned appropriately to all or a set of pixels of the polymorphic display. Additionally, the material may be pixel specific according to the intended properties of the corresponding pixel. As presented in FIG. 5A, embodiment 1600 additionally comprises a fixed-image layer 1603 containing fixed-images 1604 (here a "smiley face") and 1605 (here a "check mark"), which both can be revealed or obscured to the viewing side depending on the transmissive properties of the respective pixels 1601 and 1602. Note that here the polymorphic display is illustrated functionally as an indicator with two pixels large enough to each contain a legible image. It should be understood that the image layer may contain one or more images (also referred to herein as messages) and a polymorphic display may comprise multiple fixed-image layers. Further note that fixed-image layer 1603 may include only discrete images (such as 1604 and 1605) with no (printing) layer material in-between, as shown in FIGS. 12A-D.

The fixed-images, 1604 and 1605, may e.g. be printed or otherwise constructed or placed directly onto substrate 709 or onto a separate thin substrate or film (not shown) which subsequently is adhered to substrate 709. The back electrode 705 of this embodiment shown in FIG. 12A is transparent such that a fixed-image located on the back-side of the back electrode may be seen from the viewing side. However, it will be appreciated that the fixed-image may also be printed or placed directly onto the front side (not shown) of an optionally opaque back electrode 705, for instance, with the fixed-images printed using conductive ink of a favorably different color than the opaque electrode to provide image contrast. In either case the fixed-images may also be printed in full color. Additionally, the fixed image may also be printed or placed directly on the front side of the optional complementary conductive polymer material 714 shown in FIG. 5A), advantageously with an image construction and material which provide for sufficient image contrast and ion conductivity (e.g., porous, containing small holes). Note that "fixed images", as the term as used herein, may also include "dynamic" images that are generated after manufacture of the polymorphic display (at a preferable point during the switching cycle). For instance, with a patterned back electrode 705 (e.g., interdigitated pair per Example 4 or segmented) a desired image could be generated by polymerization of EC mix 703 onto the corresponding electrode pattern (by respective application of an activation signal across the interdigitated pair of electrodes or back segmented and front electrodes).

In the particular embodiment 1600 illustrated in FIG. 12A-D, the self-switching polymer 1606 is different than those previously discussed in Example 1, in that its stable (non-powered) state is colored (e.g. black or blue), whereas its volatile state is transparent or clear (here, for example, in the human visible wavelength range). Exemplary polymers with such characteristic include anodically coloring conductive polymers with low oxidation potentials, such as, PBEDOT-NMeCbz and PProDOP-NPrS.

Figure 12B:
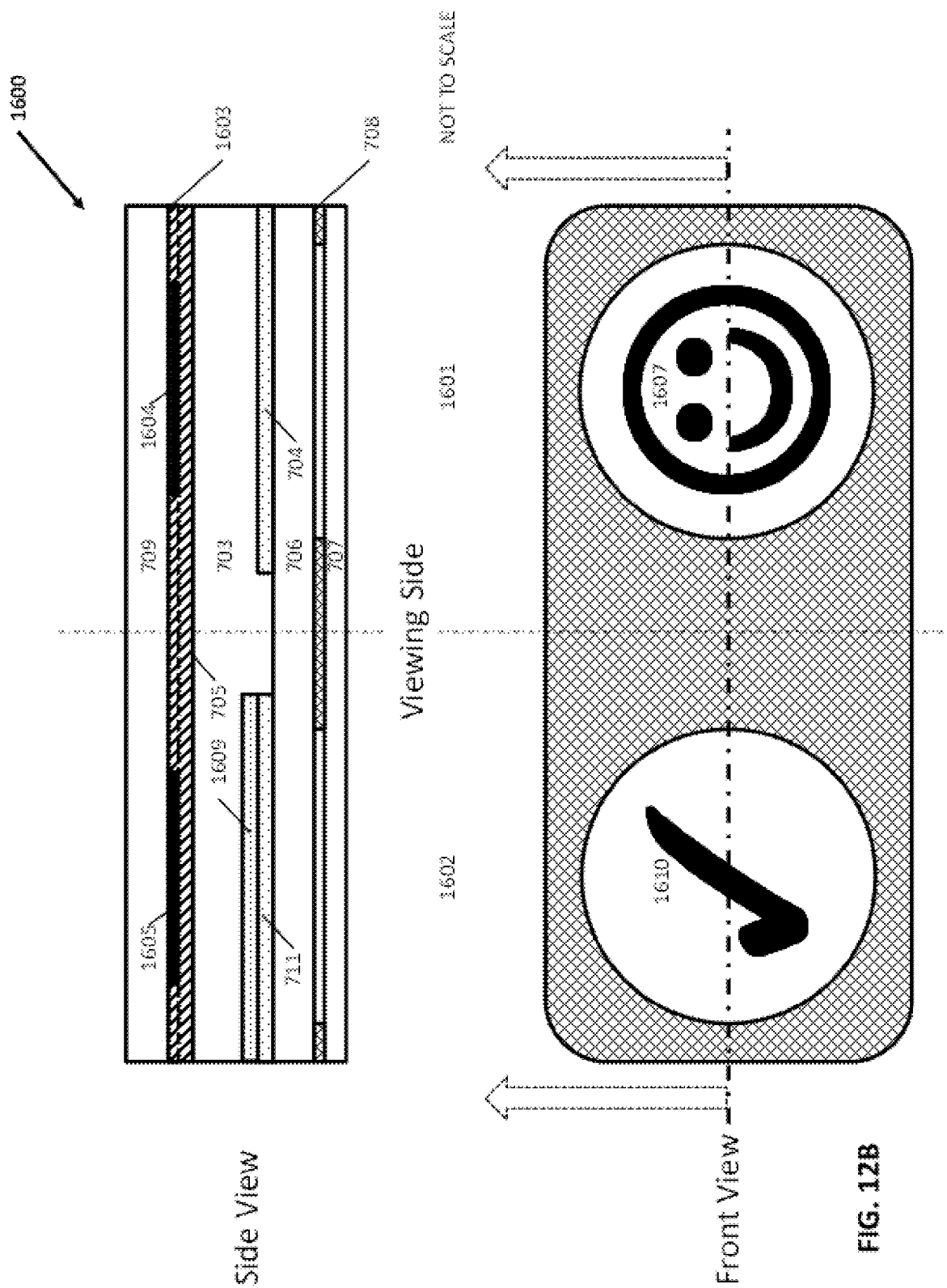
FIG. 12B is a block representative of a display in accordance with the present invention.

FIG. 12A illustrates the initial state of the polymorphic display 1600 prior to any application of switching signals across electrodes 704 and 705 of pixel 1601 and 711 and 705 of pixel 1602. In this stable pre-switched state, the vertical structure of pixel 1601 is transparent allowing fixed-image 1604 ("smiley face") to be seen 1607 from the viewing side (indicated by 1607 in the front view of FIG. 5A). The self-switchable polymer of pixel 1602 however is colored (and favorably also opaque) in its unpowered stable state, thus the fixed-image 1605 of pixel 1602 is obscured or hidden from the viewing side (indicated by 1608 in the front view of FIG. 5A). After subsequent application of a switching signal to pixel 1602 (e.g. −1V onto front electrode 711 relative to common electrode 705) a resulting transparent state of the self-switching polymer layer 1607 reveals fixed-image 1605 ("check mark"), as shown by 1610 in FIG. 12B. The fixed-mage 1605 will remain visible for the duration of the maintenance signal (e.g. indicating that device is operating). Analogous to pixel 701 in Example 1 and as illustrated in FIG. 12C, pixel 1601 is switched by applying a voltage above a certain threshold (e.g. +3V), such that the polymerized monomer layer 1611 is formed at the front electrode 704 of pixel 1601. This switching signal can for instance be in response to an event, e.g., the temperature of the display itself or the good the polymorphic display is attached to, exceeded a set threshold. As the polymerized monomer layer 1611 is colored (e.g. dark blue), and advantageously opaque, fixed-image 1604 is now hidden in a permanently and irreversibly hidden or obscured, as indicated by 1612 in FIG. 12C. Subsequently, and as illustrated in FIG. 12D, upon termination of the applied maintenance signal to the electrodes of pixel 1602 (e.g., in this case indicating a power failure), the self-switchable polymer reverts back to its stable colored state 1606, resulting in both fixed-images being hidden, as indicated by 1608 and 1612 in FIG. 12D.

Figure 13:
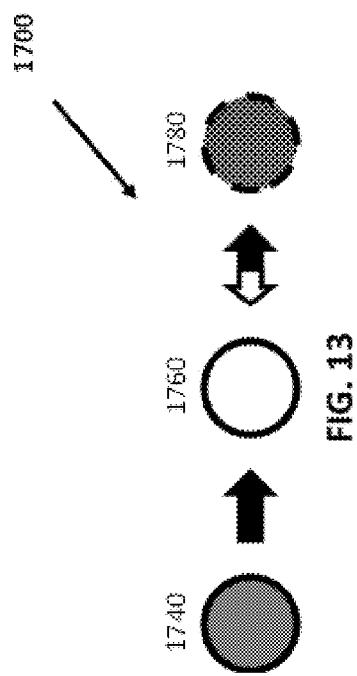
FIG. 13 is a diagram showing operable states and corresponding optical states for a display in accordance with the present invention.

As discussed above, there are many electrochromic conductive polymers which are mono-stable and self-switchable and could be used as layer with either a transparent (clear) state in the stable state (e.g., 710 in FIG. 5A) or self-erasing state (as indicated by 1609 in FIG. 12B). However, there are also some that are bi-stable with both self-switchable and irreversibly switchable operable properties. Such polymers provide for expanded shutter mode functionality. Specifically, the operable states of such a pixel 1700 as shown in FIG. 13, exhibit a first colored stable state 1740 as deposited (e.g. spray casted), and are irreversibly switchable to a second colored or transmissive stable state 1760 after applying a first switching signal, and further switchable to a third colored volatile state 1780 after applying a second switching signal. Analogous to above, it will remain in the volatile third state 1780 for the duration of the maintenance signal. When the maintenance signal is terminated (or disrupted for any reason) it self-switches (transitions back) to the stable, second state 1760.

For example, the first stable state for a spray cast film of a disubstituted poly(propylenedioxythiophene) PProDOT (CH$_2$OEtHx)$_2$ [*Macromolecules*, 2004, 37 (20), pp 7559-7569] (prior to power being applied for the first time) is red 1740, the second stable state corresponding to an oxidized chemical state (after a first switching signal is applied) is transparent (or clear) 1760, and the third volatile state corresponding to a neutral (reduced) chemical state (after a second switching signal followed by a maintenance signal is applied) is blue 1780. The third state is achievable through a phenomenon called "doping induced order" where the expulsion of the electrolyte allows a reorganization of the polymer backbone to a lower energy state. Such an exemplary three-state polymer could advantageously be applied as layer 1606 of pixel 1602 of the polymorphic display shutter structure 1600 in FIG. 12A. For example, with such a three-state polymer, pixel 1602 could provide augmented indication (or message), that the display (and associated good) has never been powered up or activated by indication of a stable red state, which is irreversibly switchable to a second clear and stable state (revealing image 1605), followed immediately by a second switching signal transitioning to the third volatile blue state (indicating the power is on). If the maintenance signal in this state is subsequently terminated (for instance, when power is no longer available), it self-switches back to the second clear state revealing image 1605 (which, in this case, may indicate a "no power" symbol).

Note that polymers with such characteristics can, for example, also be utilized as material layer 710 of pixel 702 in FIG. 5A or of pixel 801 in FIG. 6A, to provide for bistable, irreversibly switchable, and self-switchable operable properties in conjunction with appropriately selected switching signals and signal protocol.

Example 6 (Compartmentalized Structure)

Figure 14:
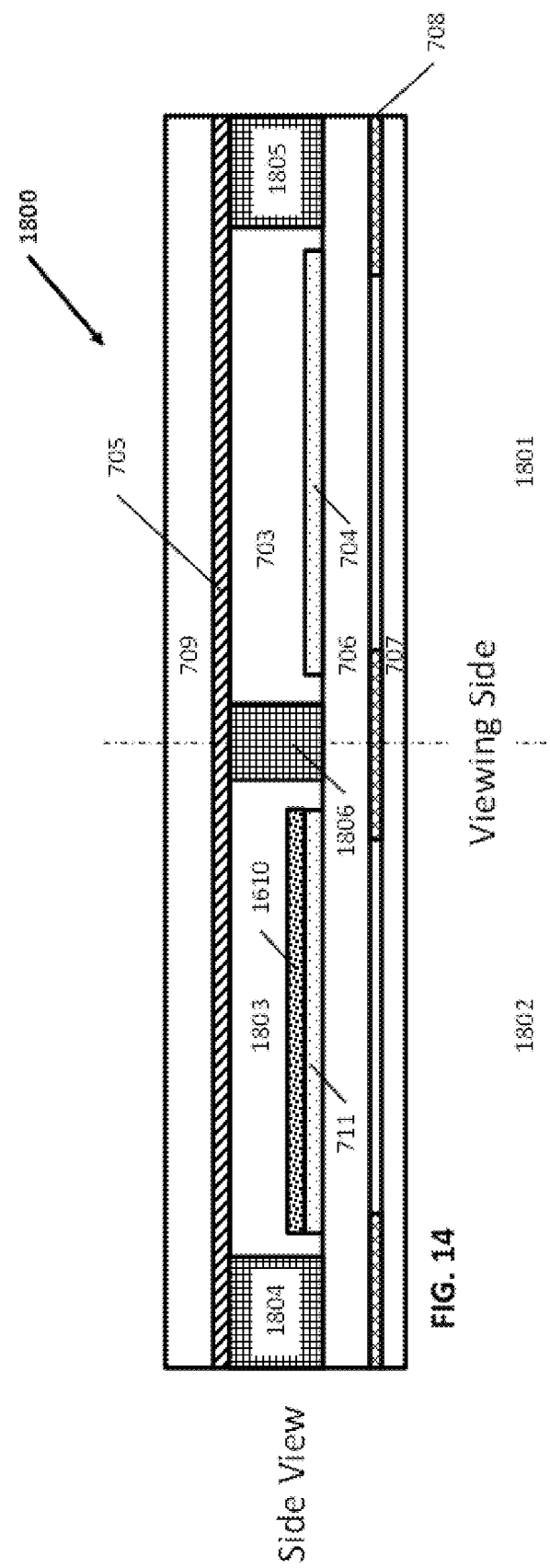
FIG. 14 is a block representative of a display in accordance with the present invention.

In some polymorphic display configurations it may be desirable to contain the EC mix or electrolyte material by means of compartments within a common structure as illustrated by polymorphic display embodiment 1800 in FIG. 14. This is, in particular, applicable for cases in which the EC mix or electrolyte is characterized by a relatively high viscosity (e.g., after deposition or printing). However, it is also advantageously utilized for polymorphic displays for which individual pixels require different types of electrolytes (for optimized electrochromic functionality) or comprise distinct electro-optic materials. Such electro-optic materials may comprise any material that can affect reflected, transmitted, or emitted electro-magnetic radiation (e.g., amplitude, intensity, polarization, and/or wavelength) based on an electric input (e.g. switching) signal. Examples of such electro-optic materials include liquid crystals (e.g., cholesteric and ferroelectric), electrophoretic (particle systems), electrochromic materials, electrowetting fluids, electro-liquid powder materials, plasmonic nanostructures, optical interference stacks (including those switched by microelectromechanical systems), photonic crystals, and phosphorescent materials, as well as, emissive materials such as LED materials, OLED (and other electroluminescent) materials, quantum dot materials (photo-emissive or electro-emissive), or any combination thereof. Note that such compartmentalized structures may also be utilized for hybrid displays for which the achievable operable states of each pixel are the same but, for instance, the achievable optical states are different.

Embodiment 1800 is similar to embodiment 1600 in FIG. 12A without the fixed-image layer 1603, and will not be explained in detail expect where there are differences. The key difference of embodiment 1800 as compared to embodiment 1600 is the integration of a compartmentalized structure (vertically) spanning the front transparent substrate 706 and the back (here common) electrode 705, thus providing containment of the EC mix 703 of pixel 1801 and electrolyte 1803 (e.g. ionic liquid) of pixel 1802. The thickness of the containment wall 1806 in-between pixels (here 1801 and 1802) may be different (e.g. thinner as shown) as compared to those containing edge pixels of the polymorphic display (here 1804 and 1805). The thicknesses and aspect ratios of the walls are favorably optimized taking into account the compartmentalized structure material (e.g., flexible polymer), rigidity (or viscosity) of the EC mic 703 and electrolyte 1803, flexibility of the display, as well as, functionality and lateral fill factor of the pixels. For high resolution displays, it may further be preferable that the compartmentalized structure material be made opaque (e.g. by adding a light absorbing dye or ink particles) to enhance the image quality of the completed polymorphic display.

The compartmentalized structure may, for instance, be fabricated from a solid uniform film by accordingly removing material (e.g. by laser ablation), before it is applied (with e.g. an adhesive) to the front substrate 706 or back substrate 709 (with transparent of opaque conductive layer 705), or generated in place by a photolithographic process.

In an alternative variation of embodiment 1800 (commonly used for pixelated electrophoretic displays), the compartmentalized structure may be generated through an embossing process, e.g., by embossing a thermoplastic or photopolymer layer onto conductor layer 705 supported by back substrate 709, with subsequent filling/sealing of the electro-optic material, and attachment to the front substrate 706 (with pixelated transparent conductors). Such a structure would enable switching of polymorphic display pixels based on, for example, electro-optic materials that respond to an electric field including, e.g., electrophoretic and liquid crystal materials. However, in this alternate embodiment without direct exposure to back electrode 705 (e.g. through removal of any residual embossing material), electro-optic materials requiring low resistive interface to its corresponding electrodes (such as electrochromics) would not switch. Advantageously, however, such electrochromic functionality can be achieved by substituting the front pixel electrode (e.g. 704 or 711) with a pair of interdigitated electrodes (as illustrated in Example 4).

Example 7 (Alternate Compartmentalized Structure)

Figure 15A:
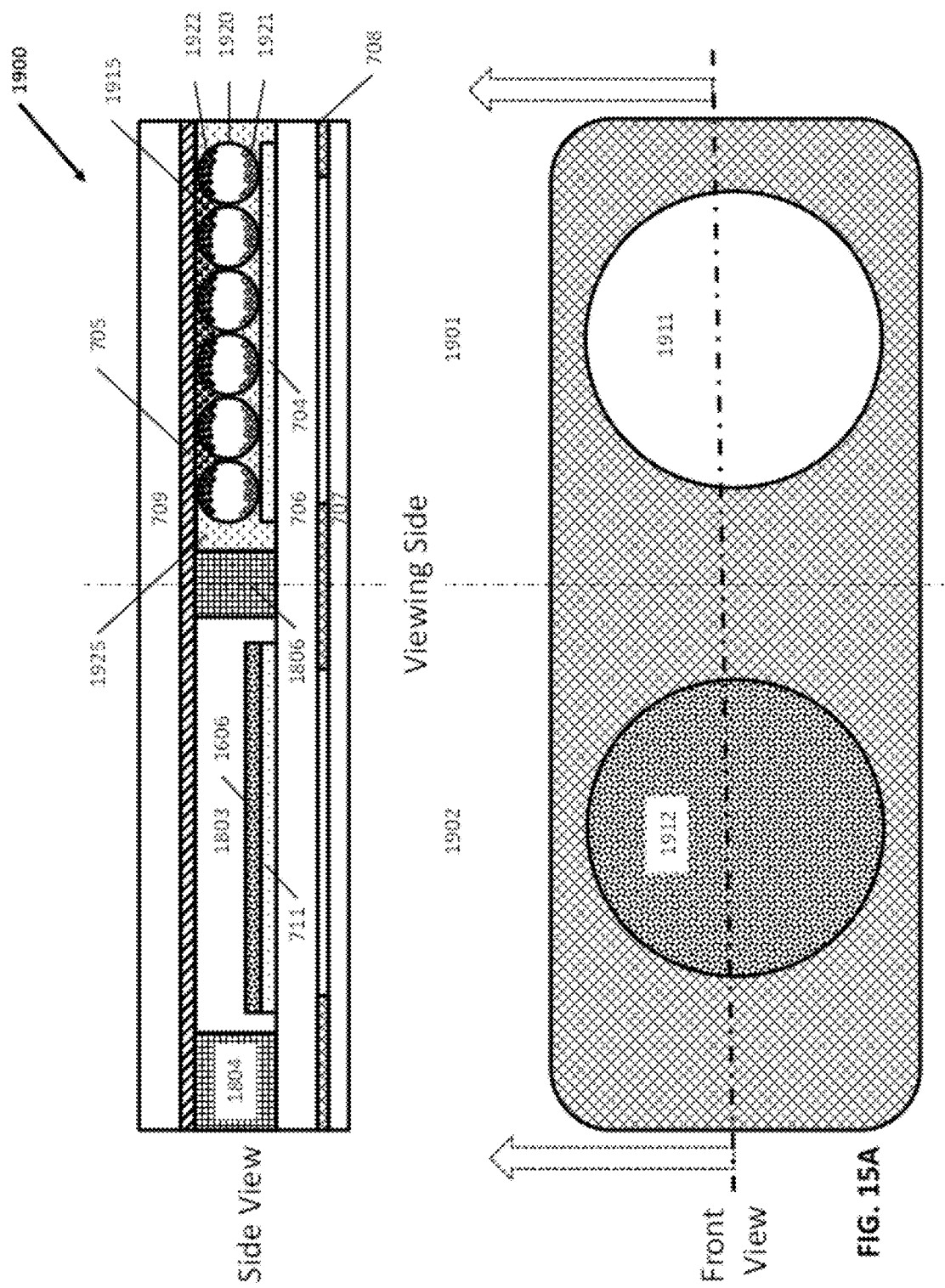
FIG. 15A is a block representative of a display in accordance with the present invention.

In some polymorphic and hybrid displays it may advantageous to provide a common compartmentalized structure for only some of the pixels in the display. For instance, electro-optical material compositions that are relatively solid or semi-solid after deposition (and potentially curing or solidifying) may not require a permanent support structure. Such electro-optic materials include those favorably formed into films, with or without a permanent (or temporary) supporting substrate, in separate processes for subsequent integration into the polymorphic or hybrid display. FIG. 15A illustrates an embodiment 1900 of such a polymorphic display in its pre-powered state, in side and front views, with two (indicator) pixels comprising a bi-stable electrophoretic right pixel 1901 and a monostable and self-switchable left pixel 1902.

The left pixel is functionally similar to pixel 702 illustrated in FIG. 5A, thus only differences will be highlighted. For simplicity, the optional complementary conductive polymer material 714 is not shown. The electrolyte 1803 (e.g., ionic liquid) may be transparent or contain a coloring additive (e.g., TiO$_2$). Structurally, pixel 1902 is similar to that of 1802 of embodiment 1800, discussed in Example 6, with containment walls 1804 and 1806. In the stable pre-powered colored (here shown as black) state of the conductive polymer layer 1606, the indicator output 1912 of pixel 1902 is black, as shown in FIG. 15A.

The right pixel 1901 comprises an electrophoretic microencapsulated electro-optic layer of spheres 1920 filled with suspension fluid containing two types of oppositely charged ink particles, white 1921 and black 1922. These particles move in response to an applied electric field between electrodes 704 and 705, such that white ink particles 1921 remain stable at the front surface after application of a switching signal applied to the electrodes (of a specific polarity), whereas the black ink particles 1922 (of opposite charge) remain stable at the back of the electro-optic layer as shown in FIG. 15A. Thus as shown in FIG. 15A, the resulting indicator output 1911 of pixel 1901 is white.

Figure 15B:
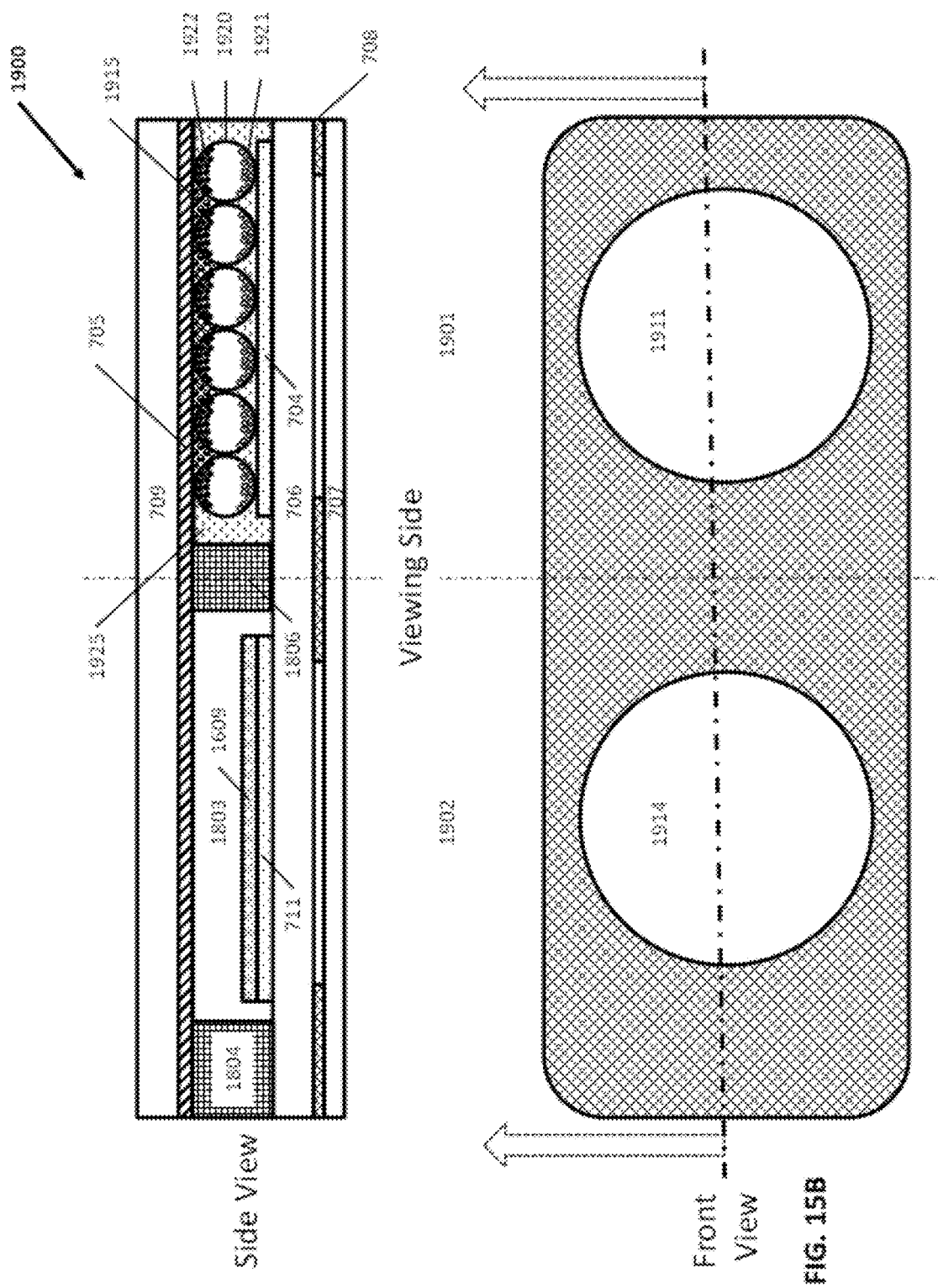
FIG. 15B is a block representative of a display in accordance with the present invention.
Figure 15C:
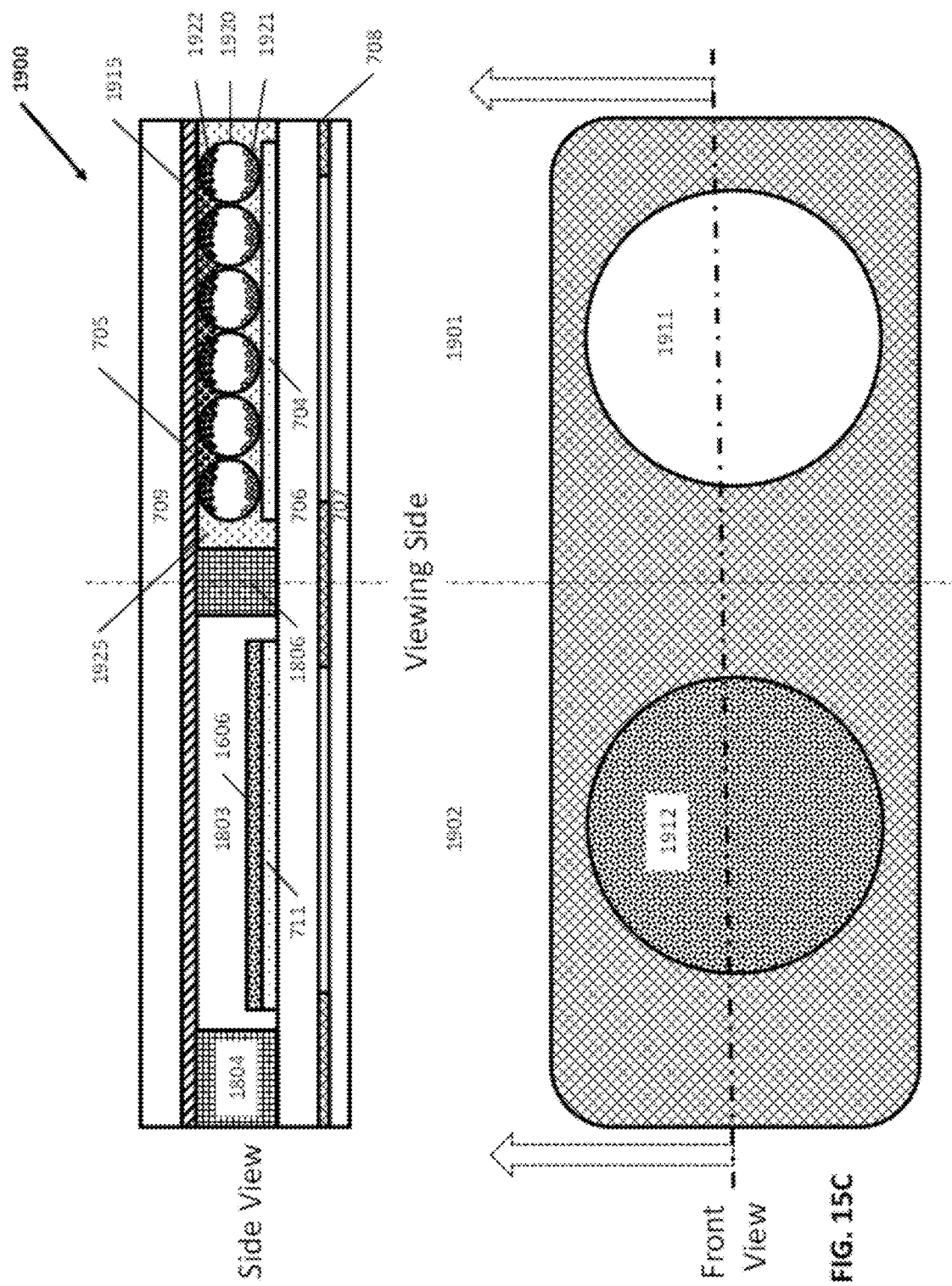
FIG. 15C is a block representative of a display in accordance with the present invention.
Figure 15D:
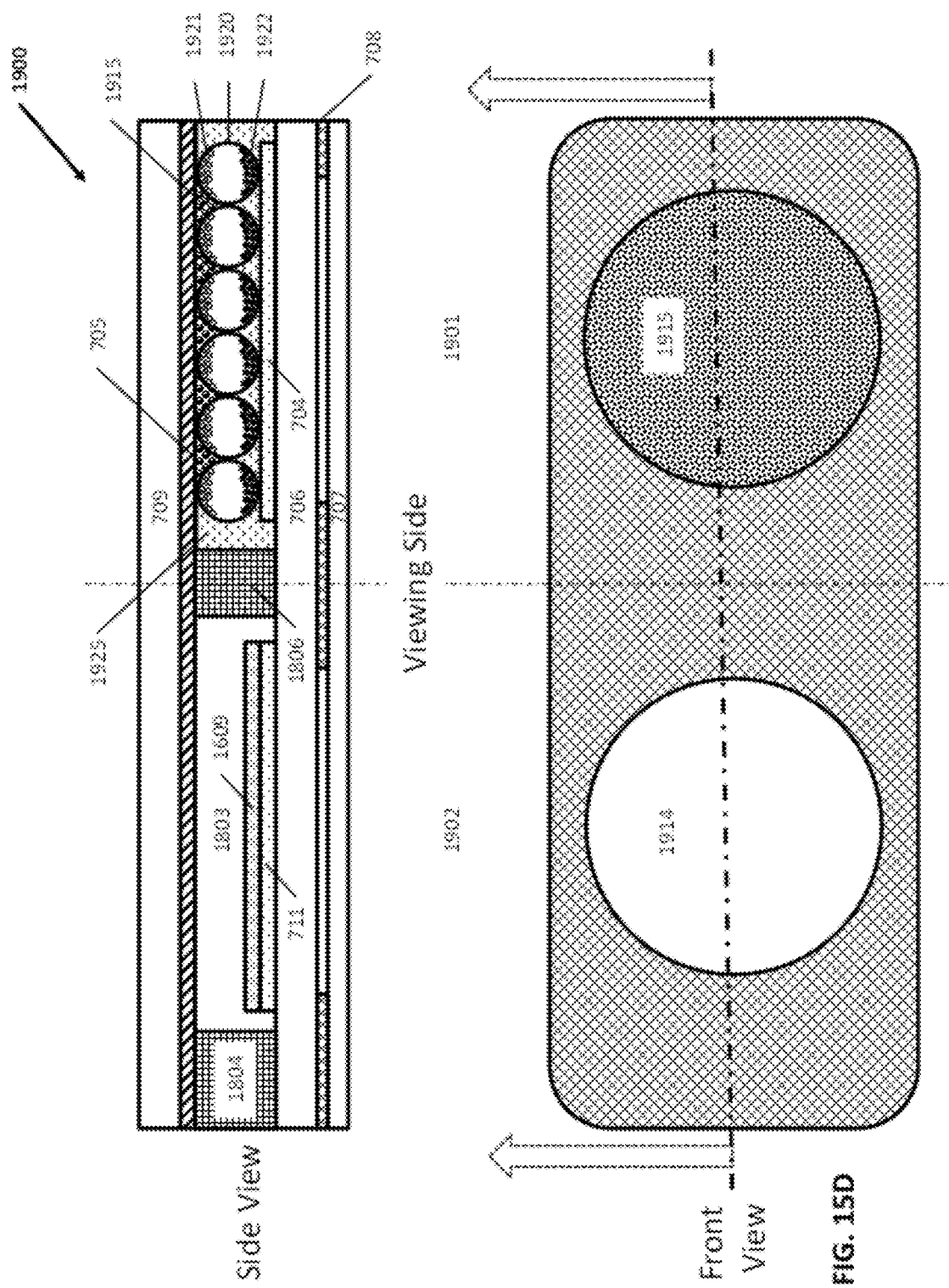
FIG. 15D is a block representative of a display in accordance with the present invention.
Figure 15E:
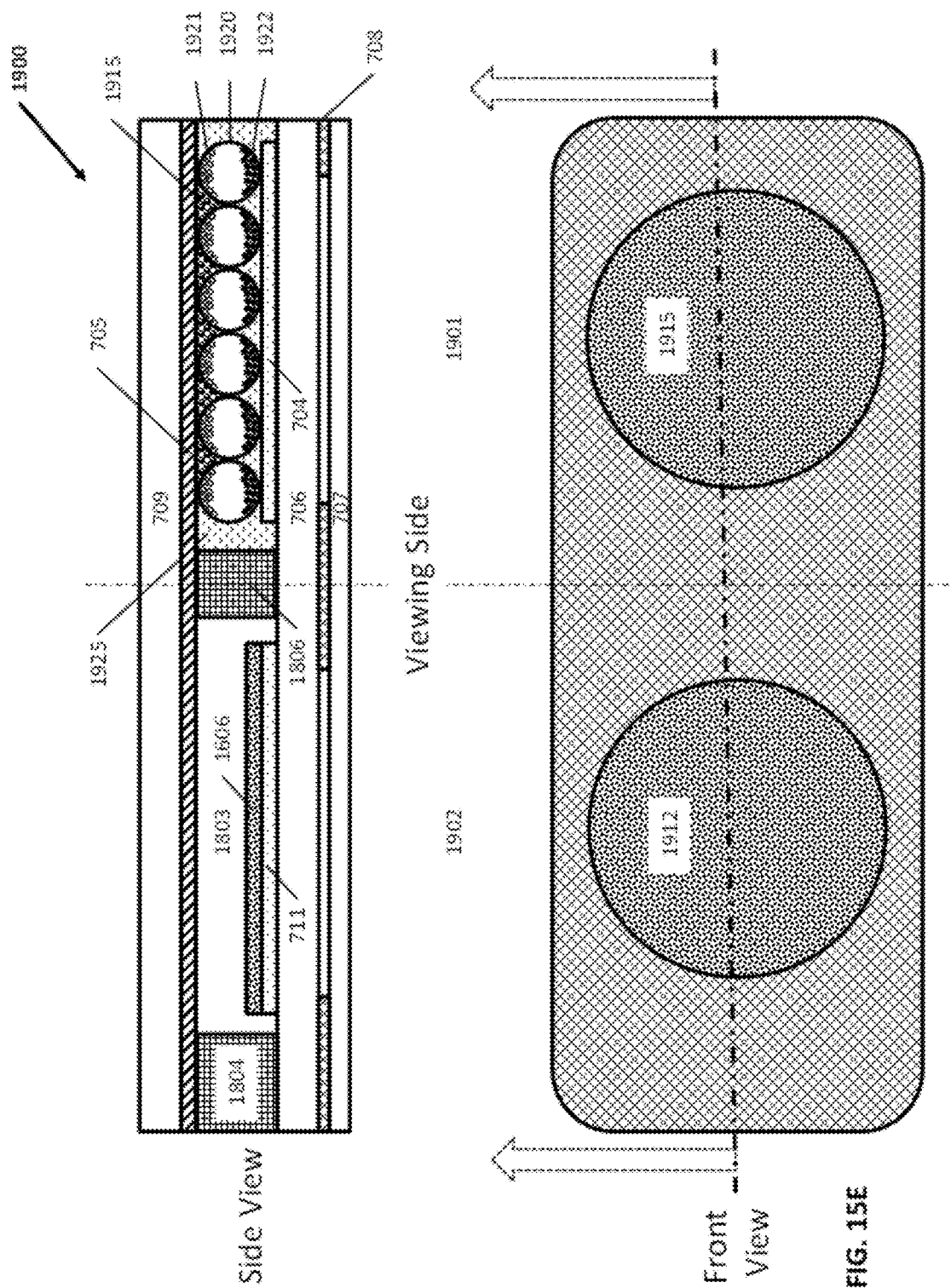
FIG. 15E is a block representative of a display in accordance with the present invention.

With the pre-powered state of embodiment 1900 in FIG. 15A discussed above and referring to FIGS. 15B-E an exemplary switching sequence of embodiment 1900 is now detailed. In FIG. 15B pixel 1902 is switched (analogously to pixel 1602 in FIG. 12B) to its volatile state (e.g. indicating the display is powered up), resulting in a clear state of polymer layer 1609 and a white state of the indicator output 1914 (here assuming, for example, that electrolyte includes a TiO$_2$ coloring additive). The state of indicator will self-switch back to output 1912, as shown in FIG. 15C, if the corresponding maintenance signal is no longer applied to the electrodes of pixel 1902, e.g., if a loss of power occurs. If, however, the maintenance signal remains with the display (indicator) in a powered state, pixel 1901 can favorably indicate the occurrence of an event (e.g., the temperature of the display or associated good exceeds a set limit) by switching the state of the electrophoretic electro-optical layer such that the black ink particles are now instead at the viewing side, corresponding to a black stable state of the indicator output 1915 as shown in FIG. 15D. Finally, if a subsequent loss of power occurs, pixel 1902 reverts back to black indicator output state 1912 with the bi-stable indicator output remaining black, as indicated by 1915 in FIG. 15E. Note that in this particular embodiment 1900 both pixels are reversible. Thus after a reset of pixel 1901 (to a white state initial state) the entire sequence can be repeated.

Commonly, electrophoretic microencapsulated electro-optic layers are formed in roll-to-roll processes onto a non-patterned electrode layer on a support substrate. This allows for prefabrication of the electrophoretic electro-optic layer of pixel 1901 of embodiment 1900 onto back substrate 709 with the non-pattered electrode layer 705 using an adhesive 1915. The area of the prefabricated substrate 709 with exposed electrode 705, commonly used for required electrical connection (e.g. using conductive adhesive), can also be used, and extended if necessary, as a means to form the compartmentalized structure (1804 and 1806) onto. Advantageously, the compartmentalized structure may also be formed onto front substrate 706 facilitating alignment to pixelated electrodes (704 and 711). In either case the electrophoretic electro-optic layer is attached electrode 704 and substrate 706 by a transparent adhesive 1925, whereas the pre-filled electrolyte material 1803 is sealed by the adhesively attached compartmentalized structure. Note that depending on the particular configuration including the separation ("dead space") between pixels 1901 and 1902 and substrate thicknesses of 706 and 709, the thickness of the compartmentalized structures 1806 and 1804 (defining the thickness of electrolyte material 1803) may be different than that of the electrophoretic electro-optic layer of pixel 1901, and the structure wall 1806 may be optional.

It will be appreciated that there are many variations of exemplary embodiment 1900 of FIG. 15A. For example, it may be advantageous to configure in an "inverted" structure such that the prefabricated electrophoretic electro-optic layer with non-patterned electrode layer faces the viewing side. Although this would require the non-patterned electrode layer to be transparent, it would allow the back patterned electrode layer, as well as, the (optionally conductive) adhesive 1925 to be opaque. Further, the self-switching conducting polymer layer could be either printed on the front prefabricated electrode layer or on the back patterned electrode layer. The latter case would preferably include a transparent electrode material 1803, as the polymer layer is viewed through the electrolyte.

Additionally, it should be noted that although exemplary embodiment 1900 in FIG. 15A illustrates an electrophoretic display pixel 1901 with two distinct states, electrophoretic electro-optic materials may also comprise a multitude of stable states (e.g., a number of stable distinguishable grey levels); or contain three or more types of ink particles and/or a colored suspension fluid with corresponding stable color states.

Example 8 (Pixels Constructed with Different Redox and Electrolyte Layers)

As discussed above, there are many advantages to achieve irreversible modalities in polymorphic pixels and displays using single layers of EC mixtures (comprising monomers and electrolytes). In some cases, however, it may be desirable to achieve different operable properties by creating pixels that comprise separate redox layers (layers comprised of redox materials such as electro-polymerizable monomer(s) or conductive polymers and electrolyte layers). And further, where the redox layers (or the electrolyte layers) are advantageously solid or semi-solid, porous or a gel; flexible, semi-flexible or rigid.

As with electro-polymerizable monomers disbursed within an EC mixture, electro-polymerizable monomer layers are polymerized in-situ, i.e. within the display device. One preferred embodiment is a polymorphic display comprising different sets of pixels, each comprising different redox layers and a shared electrolytic layer that spans multiple pixels—and can provide independent pixel switching. Independent switching is achieved for example with a polymorphic display comprising a permanent and irreversible pixel (constructed with an electropolymerizable monomer layer) and a self-switchable pixel (constructed with a conductive polymer layer), where the two pixels share a common electrolytic layer, even if the respective switching voltage levels are comparable and/or their ranges are overlapping (i.e., not highly non-linear with distinct threshold voltages).

Favorable redox materials (e.g., electropolymerizable monomers and conductive polymers) for redox layers are those that are solid in the temperature range of interest of the display device (e.g. operating and storage temperature ranges), in contrast to those that form liquids (of various viscosities) suitable for single-layer EC mixtures. Further, the electro-polymerizable monomers (and subsequently polymerized monomers) are preferably insoluble in the electrolyte, which improves compatibility with a large range of electrolytes (e.g. ionic liquids). For example, hydrophobic monomers would be less likely to dissolve/disperse in polar ionic liquid.

Of particular interest are electro-polymerizable monomers (including macromonomers and oligomers) that are characterized by relatively high molecular weight, e.g. benzophenone, benzothiadiazoles, carbazoles, fused aromatic ring systems, fluorenone, and further specifically fluorinated monomers (and compounds), as they tend to aggregate together to form solid layers. Electro-polymerizable monomers that oxidize at relatively high potentials (say, for example, at +0.1V vs. Fc/Fc+ or higher) are also advantageous as these are less susceptible to oxidation and therefore more stable in (pre-switched) display devices and thus reducing or eliminating the need for high-performance device barrier layers/encapsulation.

A electro-polymerizable monomer layer may be deposited onto the electrode layer (e.g. 704 or 705 of of pixel 701 in FIG. 5A) using a variety of methods (similar to the conductive polymer layer for self-switchable pixel, see e.g. 710 of pixel 702 in FIG. 5A), including spray casting, screen or inkjet printing, gravure coating, etc. These deposition methods may further be solution based (solvent assisted) using either polar or non-polar solvent depending on the monomer's properties, and include other additives such as polystyrene (to increase viscosity) or adhesion promotors (e.g. Silquest 187-A Silane; or EDOT-acid as a separate sublayer). Exemplary solvents include cyclopentyl methyl ether (CPME), 2-methyltetrahydrofuran, dihydrolevoglucosenone (cyrene), acetonitrile, etc. Similarly to the EC polymer layer for self-switchable pixels (e.g., 710 of pixel 702 in FIG. 5A-B), electro-polymerizable monomer layers may be patterned onto (partially or substantially conforming to) a pixelated electrode, or deposited as a continuous (shared) layer across multiple pixel electrodes (favorably with sufficient spacing between neighbor pixel electrodes). Deposited (and patterned) electro-polymerizable monomer layers may have pixel-specific monomer properties to achieve pixel particular optical states (e.g. colors) and/or pixel specific modalities for polymorphic displays. The redox layer may also contain multiple electropolymerizable monomers to achieve a broader spectrum of optical states, e.g. by blending the monomers in different ratios to form a single solid layer, forming multiple solid sub-layers each with a different polymerizable monomer, or any combination thereof. The multiple monomers may also comprise dissimilar (e.g. distinct or overlapping but shifted ranges of) polymerization activation thresholds to achieve different optical states by application of distinct switching signals/protocols (e.g. voltage levels, durations, etc.) to the addressing electrodes.

The electrolyte layer may include solid polymer electrolytes, gel polymer electrolytes, and polyelectrolytes, with green alternatives in gel polymer electrolytes based on e.g. cellulose or lignin, or ionic liquids. Advantageously, the electrolyte may also be deposited using a variety of printing techniques, as previously discussed, and may be a liquid (favorably contained) or (highly) viscous layer (with increased mechanical and interfacial stability by additives including, e.g. zeolites, $Al_2O_3$, MgO, or $SiO_2$), or advantageously made semi-solid or solid with appropriate additives (e.g. thermally or UV curable monomers, microbeads, etc.) to form fully solid device stacks (including the electrode materials). The electrolyte layer may additionally include colorants (e.g., pigments, dyes, or $TiO_2$).

Solid electro-polymerizable monomer layers can provide for a multitude of operable properties for polymorphic display pixels and polymorphic pixels. In the case of a single substantially uniform electro-polymerizable monomer layer, the polymodal properties and modalities include a first stable state, corresponding to a first optical state (e.g. a first color) as deposited. The first state is irreversibly switchable to a second state (by oxidatively electropolymerizing the solid monomer layer), corresponding to a second optical state (e.g. a second color), which may be either stable or volatile depending on the properties of the monomer. In case of a stable second state, the polymerized (oxidized) monomer may further be switchable to a volatile third state (i.e., analogous to the operable states 1700 shown in FIG. 13), corresponding to a third optical state (e.g. a third color), and remain in this (reduced polymerized) state for the duration of the maintenance signal (as discussed above). When the maintenance signal is terminated (or disrupted for any reason) it self-switches (transitions back) to the stable, second state. Whereas in the case of a volatile second state, the electropolymerized monomer remains in this state for the duration of the maintenance signal after which it self-switches to a third stable state, corresponding to a third optical state (e.g. a third color). Note that the respective optical states, i.e. first, second, and third colors of the solid EC layer (either the monomer or the electropolymerized monomer) may correspond to a transparent, lightly colored semi-transparent, or colored opaque state, which may be non-reflective (absorptive), semi-reflective, or reflective. In the case of transparent or semi-transparent properties, or relatively thin layers, the pixel color may be different than the monomer layer depending on properties of the layer(s) viewable behind the redox layer (e.g. through intentional color blending by means of a colored electrolyte and/or back electrode/substrate or reflective interference stack effects). The third optical state may also be indistinguishable from that of the second state (e.g. for a wavelength or within a wavelength range).

A single electro-polymerizable monomer layer (including sub-layers of electro-polymerizable monomers) may also be deposited on the back (counter) electrode of a pixel (e.g., instead of the self-switching polymer layer 1102 of polymorphic pixel 1101 in FIG. 9A), or layers of the same or different monomer properties on each electrode (with the completed display device viewable from one or both sides), to achieve different polymorphic modalities. Although an irreversible switching modality can be achieved with a separate electro-polymerizable monomer layer in conjunction with an adjacent electrolyte layer, an EC mix layer (e.g., 703 of embodiment 1100 in FIG. 5A), which includes polymerizable monomers, could also be used as the electrolyte layer to achieve additional irreversible transitions, e.g. with the electro-polymerizable monomer layer and the in-mix monomer layer activated at different polymerization thresholds.

Figure 16A:
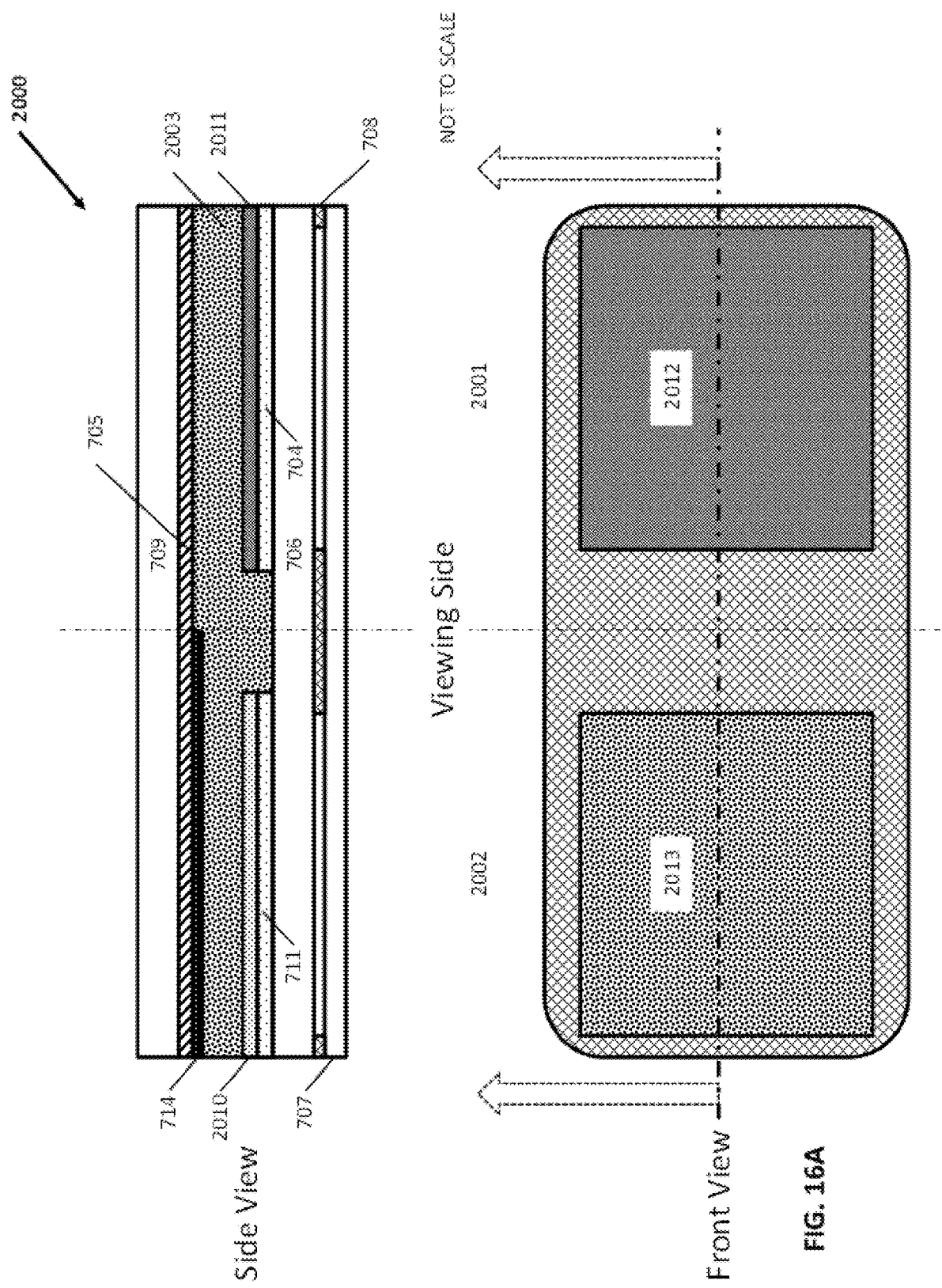
FIG. 16A is a block representative of a display in accordance with the present invention.

FIG. 16A shows an exemplary configuration of a polymorphic display 2000 comprising two pixels, each having different operable properties, in side view and front view. For illustration purposes, only two pixels are shown although it is to be understood that a polymorphic display may comprise many such pixels (and sets of pixels). The right pixel 2001, comprising a solid monomer (redox) layer 2011, is bi-stable with both self-switchable and irreversibly switchable operable properties (such as 1700 in FIG. 13), whereas the left pixel 2002 is mono-stable and self-switchable (such as 100 in FIG. 1).

Figure 16B:
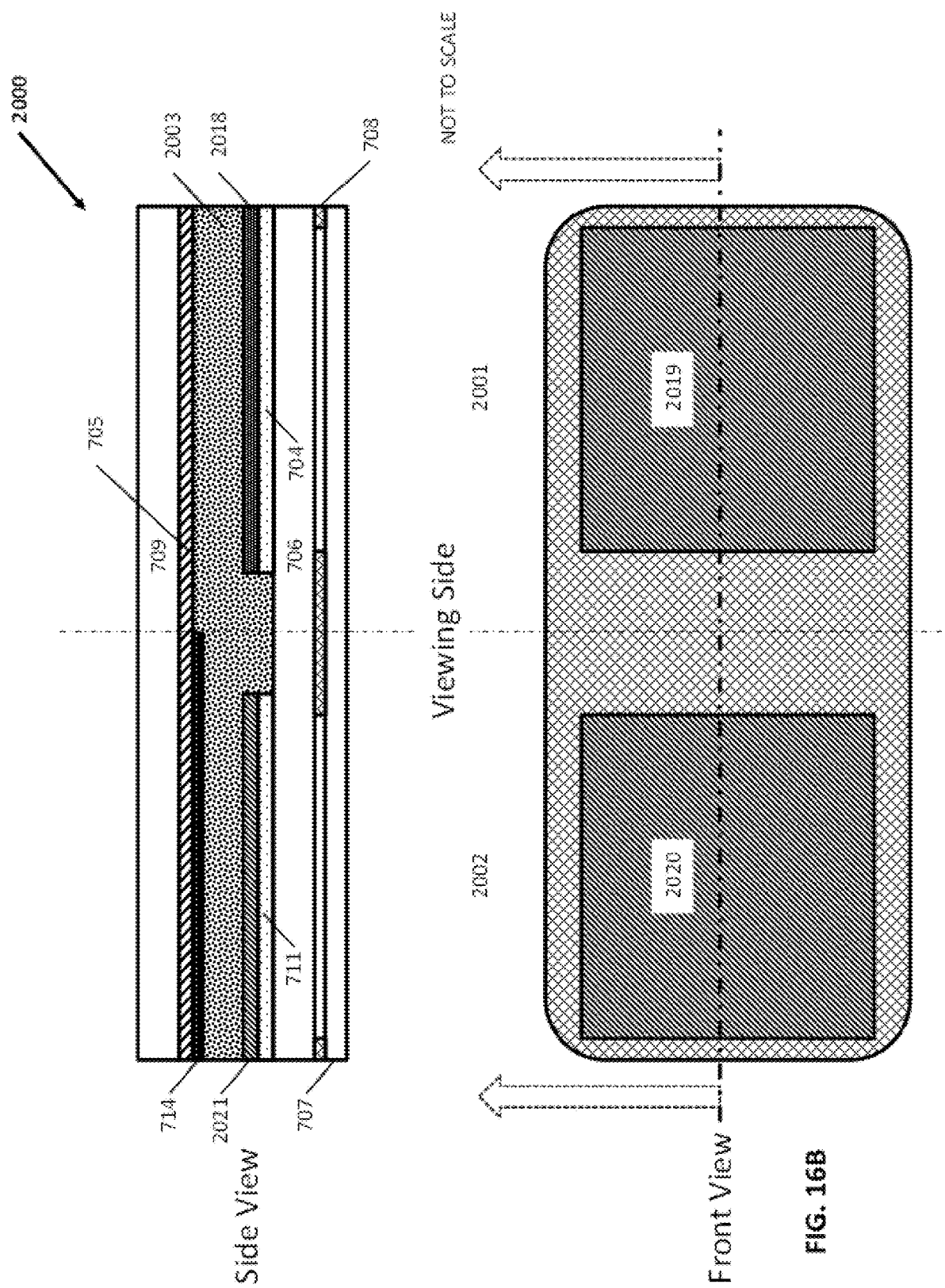
FIG. 16B is a block representative of a display in accordance with the present invention.

The left pixel 2002 of FIG. 16A is similar to pixel 702 in FIG. 5A, thus only differences will be discussed. Specifically, instead of having an EC mix 703 functioning as an electrolyte, pixel 2002 (and pixel 2001) comprises a shared electrolyte (without a monomer) which is colored yellow (e.g. ionic liquid with an appropriate pigment or dye). The self-switchable redox layer comprising a conductive polymer 2010 is green in its volatile state and substantially transparent in its stable state [e.g. a spray cast film of ECP-G Chem. Mater. 2012, 24, 255-268]. FIG. 16A shows pixel 2002 prior to application of a switching signal (to pixel electrode 711 and common electrode 705), with the pixel having a transparent conductive polymer layer 2010, and a corresponding yellow optical state 2013. FIG. 16B shows pixel 2002 after application of a switching signal (and application of a maintenance signal), resulting in a green polymer layer 2021, and a corresponding green optical state 2020. The pixel remains in its volatile state until the maintenance signal is terminated, at which point it self-switches back to its yellow stable state 2013 as shown in FIG. 16C.

The right pixel 2001 is similar to pixel 701 in FIG. 5A, thus only differences will be discussed. Specifically, this exemplary embodiment comprises a redox layer comprising a solid electro-polymerizable monomer 2011 of fluorenone-thienylene vilylene [TVF] (((2,7-bis(5-[(E)-1,2bis(3-octylthien-2-yl)ethylene])-fluoren-9-one) ["Solution versus solid-state electropolymerization of regioregular conjugated fluorenone-thienylene vinylene macromonomers—voltammetric and spectroelectrochemical investigations", R. Demadrille et al., J Solid State Electrochem (2007) 11:1051-1058]. This exemplary electro-polymerizable monomer 2011 is red in its first stable state (prior to power being applied for the first time), with the pixel 2001 having a corresponding red optical state 2012 as shown in FIG. 16A. This operable state is irreversibly switchable, by applying a switching signal across pixel electrodes 704 and 705, to a second stable state, corresponding to a light blue in color (2018 in FIG. 16B). The change in the operable state and optical state (color) occurs by solid-state electropolymerization of the solid TVF monomer in conjunction with the shared electrolyte layer 2003 of pixel 2001. The light blue polymerized layer 2018 is partially transparent (and reflective) and color blends with the yellow electrolyte layer 2013 to yield an approximately green optical state 2019. It can be appreciated that the composite color of the optical state 2019 can be tuned, e.g. by selection of monomer layer 2011 thickness, concentration and selection of electrolyte colorant, or activation protocol (e.g. duration of activation signal). For example, it may be desirable to color match the composite optical state 2019 to the optical state 2020 of the volatile state of self-switching pixel 2002. Further, after application of a second switching signal the polymerized layer switches to a volatile third state, which is orange/red 2014, with a corresponding orange/red optical state 2015 of pixel 2001, as shown in FIG. 16C (note that the orange/red color and corresponding pattern used in FIG. 16C is not included in the Legend of FIG. 11). Analogous to above, the pixel 2001 will remain in this volatile state (and corresponding optical state 2019) for the duration of the applied maintenance signal. Upon termination of the maintenance signal the pixel self-switches back to its stable, second optical state 2019.

Other combinations of the polymorphic display 2000 are also possible. For instance, pixel 2002 could be constructed as pixel 2001 but with a solid monomer comprising a different modality of e.g. a volatile second state and a stable third state. Alternatively, it could be constructed as a display with pixel 2002 having the same modalities as (polymorphic) pixel 2001, however, with a second monomer having different optical properties in one or more states of those corresponding to pixel 2001.

It will be appreciated that although pixel 2001 comprises a solid electropolymerizable monomer (redox) layer 2011 in combination with an electrolyte layer 2003 which may be a liquid, semi-solid or solid, it could alternatively, or additionally (e.g. two redox sublayers), comprise a liquid electropolymerizable monomer layer in combination with a semi-solid, gel, or solid electrolyte layer. Alternatively, the redox layer may contain a liquid monomer in a mix (e.g. an EC mix as above) or form a gel or semi-solid layer (e.g. by adding for example zeolites, $Al_2O_3$, MgO, or $SiO_2$, or polymer such as polystyrene to the mix, or providing a porous or a printed microscale structure for the layer).

While particular preferred and alternative embodiments of the present intention have been disclosed, it will be appreciated that many various modifications and extensions of the above described technology may be implemented using the teaching of this invention. All such modifications and extensions are intended to be included within the true spirit and scope of the appended claims.

What is claimed, is:

1. A polymorphic display comprising;
    a plurality of pixels;
    the plurality of pixels each comprising a redox layer and an electrolyte layer, the electrolyte layer configured adjacent to the redox layer;
        a first set of pixels from the plurality of pixels, the redox layer of all the pixels in the first set of pixels comprising a first redox material;
        a second set of pixels from the plurality of pixels, the redox layer of all the pixels in the second set of pixels comprising a second redox material, wherein the operable properties of the pixels of the first set and the operable properties of the pixels of the second set are determined by their respective redox layers.
2. The polymorphic display according to claim 1, wherein the redox layer of the first set of pixels comprises a first electropolymerizable monomer, and the redox layer of the second set of pixels comprises a second electropolymerizable monomer.
3. The polymorphic display according to claim 1, wherein the redox layer of the first set of pixels comprises an electropolymerizable monomer, and the second redox layer comprises a conductive polymer.
4. The polymorphic display according to claim 1, wherein at least one of the operable properties of the second set of pixels is different as compared to the first set of pixels.
5. The polymorphic display according to claim 1, wherein the electrolyte layer of the first set of pixels is the same electrolyte layer as that of the second set of pixels.
6. The polymorphic display according to claim 1, wherein the electrolyte layer of the first pixel set is the same as the electrolyte layer of the pixels of the second pixel set.
7. The polymorphic display according to claim 1, wherein the electrolyte layer of the second set of pixels is different as compared to the electrolyte layer of the first set of pixels.
8. The polymorphic display according to claim 1, wherein the redox layer of at least one of the plurality of pixels is pixelated.
9. The polymorphic display according to claim 1, wherein the electrolyte layer of at least one of the plurality of pixels is pixelated.
10. The polymorphic display according to claim 1, wherein one or more of the redox layers is a solid, semi-solid, or gel.
11. The polymorphic display according to claim 1, wherein one or more of the redox layers is transparent, reflective, opaque or colored.
12. The polymorphic display according to claim 1, wherein one or more of the electrolyte layers is a solid, semi-solid or gel.
13. The polymorphic display according to claim 1, wherein one or more of the electrolyte layers is transparent, reflective, opaque or colored.
14. The polymorphic display according to claim 1, wherein the redox layer of a set of pixels comprises a plurality of electropolymerizable monomers.
15. The polymorphic display according to claim 14, wherein one or more of the plurality of electropolymerizable monomers is configured as a layer.
16. The polymorphic display according to claim 15, wherein the layers of electropolymerizable monomers have distinct or overlapping shifted ranges of polymerization activation thresholds.
17. The polymorphic display according to claim 1, wherein one or more of the redox layers comprise additives, microbeads or other fillers to form a solid, semi-solid or a gel structure.
18. The polymorphic display according to claim 1, wherein one or more of the electrolyte layers comprise additives to form a solid, semi-solid or gel structure.
19. The polymorphic display according to claim 18 wherein the additives include thermally curable or UV curable monomer.
20. The polymorphic display according to claim 1, wherein one or more of the redox layers is flexible, semi-rigid or rigid.
21. The polymorphic display according to claim 1, wherein one or more of the electrolyte layers is flexible, semi-rigid or rigid.
22. The polymorphic display according to claim 1, wherein the polymorphic display is flexible, semi-rigid or rigid.
23. The polymorphic display according to claim 1, further comprising display driver circuitry.
24. The polymorphic display according to claim 23, wherein the display driver circuitry includes a display driver integrated circuit.
25. The polymorphic display according to claim 23, wherein the display driver circuitry is configured to operate a signal protocol.

26. An intelligent display device comprising,
a polymorphic display, further comprising;
   a plurality of pixels, the plurality of pixels each comprising a redox layer and an electrolyte, wherein the electrolyte layer is configured adjacent to the redox layer;
   a first set of pixels from the plurality of pixels, the redox layer of all the pixels in the first set of pixels comprising a first redox material;
   a second set of pixels from the plurality of pixels, the redox layer of all the pixels in the second set of pixels comprising a second redox material, and
   wherein the operable properties of the pixels of the first set of pixels and the pixels of the second set of pixels are determined by their respective redox layers;
   a processor;
   a memory; and
   a power apparatus.

27. The intelligent display device according to claim 26, wherein the memory is constructed to store a signal protocol.

28. The intelligent display device according to claim 27, wherein the processor is configured to generate switching or maintenance signals according to the signal protocol.

29. The intelligent display device according to claim 26, wherein the processor is configured to generate switching or maintenance signals.

30. The intelligent display device according to claim 26, further comprising a communication apparatus.

31. An intelligent display device according to claim 26, further comprising a sensor.

32. An intelligent display device according to claim 26, further comprising an actuator.

33. An intelligent display device according to claim 26, further comprising a clock or timer.

34. An electro-optic display comprising,
   a plurality of pixels;
   the plurality of pixels each comprising a redox layer and an electrolyte layer, the electrolyte layer configured adjacent to the redox layer;
      a first set of pixels from the plurality of pixels, the redox layer of all the pixels in the first set of pixels comprising a first electropolymerizable monomer;
      a second set of pixels from the plurality of pixels, the redox layer of all the pixels in the second set of pixels comprising a second electropolymerizable monomer; and
   wherein the operable properties of the pixels of first set of pixels and the pixels of the second set of pixels are the same, and the optical properties of the second set of pixels are different as compared to the first set of pixels.

35. The electro-optic display according to claim 34, wherein the second electropolymerizable monomer is the different compared to the first electropolymerizable monomer.

36. The electro-optic display according to claim 34, wherein the second electropolymerizable monomer the same as the first electropolymerizable monomer.

37. The electro-optic display according to claim 36, further wherein the electrolyte layer of the second pixel set is different as compared to the electrolyte layer of the first set of pixels.

38. The electro-optic display according to claim 35, where the redox layer of a set of pixels comprises a plurality of electropolymerizable monomers.

39. The electro-optic display according to claim 38, where one or more of the plurality of electropolymerizable monomers is configured as a layer.

40. An intelligent display device comprising,
   an electro-optic display further comprising,
      a plurality of pixels;
      the plurality of pixels each comprising a redox layer and an electrolyte layer, the electrolyte layer configured adjacent to the redox layer;
      a first set of pixels from the plurality of pixels, the redox layer of all the pixels in the first set of pixels comprising a first electropolymerizable monomer;
      a second set of pixels from the plurality of pixels, the redox layer of all the pixels in the second set of pixels comprising a second electropolymerizable monomer, and
      wherein the operable properties of the pixels of first set of pixels and the pixels of the second set of pixels are the same, and the optical properties of the second set of pixels are different as compared to the first set of pixels,
   a processor;
   a memory; and
   a power apparatus.

41. The intelligent display device according to claim 40, wherein the memory is constructed to store a signal protocol.

42. The intelligent display device according to claim 41, wherein the processor is configured to generate switching or maintenance signals according to the signal protocol.

43. The intelligent display device according to claim 40, wherein the processor is configured to generate switching or maintenance signals.

44. The intelligent display device according to claim 40, further comprising a communication apparatus.

45. An intelligent display device according to claim 40, further comprising a sensor.

46. An intelligent display device according to claim 40, further comprising an actuator.

47. An intelligent display device according to claim 40, further comprising a clock or timer.

* * * * *